(12) United States Patent
Di Girolamo et al.

(10) Patent No.: US 12,289,711 B2
(45) Date of Patent: Apr. 29, 2025

(54) SIDELINK ENHANCEMENTS RESOURCE ALLOCATION ASSISTANCE INFORMATION

(71) Applicant: INTERDIGITAL PATENT HOLDINGS, INC., Wilmington, DE (US)

(72) Inventors: Rocco Di Girolamo, Laval (CA); Pascal Adjakple, Great Neck, NY (US); Mohamed M. Awadin, Plymouth Meeting, PA (US); Qing Li, Princeton Junction, NJ (US); Yifan Li, Conshohocken, PA (US); Kyle Pan, Saint James, NY (US); Zhuo Chen, Claymont, DE (US); Allan Tsai, Boonton, NJ (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 456 days.

(21) Appl. No.: 17/995,777

(22) PCT Filed: Apr. 8, 2021

(86) PCT No.: PCT/US2021/026328
§ 371 (c)(1),
(2) Date: Oct. 7, 2022

(87) PCT Pub. No.: WO2021/207459
PCT Pub. Date: Oct. 14, 2021

(65) Prior Publication Data
US 2023/0171738 A1 Jun. 1, 2023

Related U.S. Application Data

(60) Provisional application No. 63/008,244, filed on Apr. 10, 2020.

(51) Int. Cl.
*H04W 72/02* (2009.01)
*H04W 72/20* (2023.01)
*H04W 72/56* (2023.01)

(52) U.S. Cl.
CPC .......... *H04W 72/02* (2013.01); *H04W 72/20* (2023.01); *H04W 72/56* (2023.01)

(58) Field of Classification Search
CPC ...... H04W 72/02; H04W 72/56; H04W 72/20
See application file for complete search history.

(56) References Cited

U.S. PATENT DOCUMENTS

2021/0219268 A1* 7/2021 Li .................. H04L 1/1819
2021/0352628 A1* 11/2021 Lee ................ H04W 76/36

FOREIGN PATENT DOCUMENTS

| WO | 2016/181094 A1 | 11/2016 |
| WO | 2020/006366 A1 | 1/2020 |
| WO | 2020/033088 A1 | 2/2020 |

OTHER PUBLICATIONS

3GPP TS 38.321, NR; Medium Access Control (MAC) Protocol Specification, V15.8.0, 2020, pp. 1-80.
(Continued)

*Primary Examiner* — Won Tae C Kim
(74) *Attorney, Agent, or Firm* — Flaster Greenberg P.C.

(57) ABSTRACT

The exchange of resource allocation assistance information between a requester User Equipment (UE) and an assistant UE allows the requester to make better resource allocation decisions. The assistance information may include a blacklist, a whitelist, resource allocation information, a candidate resource set, and measurement information, for example. Both UEs may have an assistance configuration to assist in the exchange of resource allocation assistance information, that may be obtained from a third apparatus, such as a base station. The configuration may include information related to when to trigger assistance, identities of UEs, and types of assistance information, for example. The requester may, based on the assistance information received, modify a candidate resource set at a Medium Access Control (MAC) layer. The requester may, at the MAC layer, determine a configured sidelink grant for a selected destination using assistance information targeting this destination.

8 Claims, 23 Drawing Sheets

(56) References Cited

OTHER PUBLICATIONS

3GPP TS 38.331, NR: Radio Resource Control (RRC) Protocol Specification, V15.8.0, 2019, pp. 1-532.
CATT: "Resource Allocation Mode Configuration", 3GPP Draft; R2-1914445, 3rd Generation Partnership Project (3gpp), Mobile Competence Centre, Nov. 2019, pp. 1-5.
Huawei, "3GPP Draft; R2-1911083 Discussion about Mode Coexistence for NR Sidelink", 3rd Generation Partnership Project (3gpp), Mobile Competence Centre, Aug. 2019, pp. 1-3.
Huawei: R2-2001966 CR 38.331: "Introduction of 5G V2X with NR Sidelink", V15.8.0, Reno, Nevada, Nov. 18-22, 2019, pp. 1-491.
Intel Corporation: "On the Support of Simultaneous Configuration of Mode 1 and Mode 2", 3GPP Draft; R2-1915727, 3rd Generation Partnership Project, Nov. 2019, pp. 1-4.
R2-2001969 CR 38.321: "Introduction of 5G V2X with NR Sidelink", V15.8.0, 2020, pp. 1-44.
R2-2002264 CR 38.300: "Introduction of 5G V2X with NR Sidelink", V16.0.0, 2020, pp. 1-18.

\* cited by examiner

SIDELINK ENHANCEMENTS RESOURCE ALLOCATION ASSISTANCE INFORMATION

CROSS-REFERENCE TO RELATED APPLICATIONS

This application is the National Stage Application of International Patent Application No. PCT/US2021/026328, filed Apr. 8, 2021, which claims the benefit of U.S. Provisional Patent Application No. 63/008,244, filed 10 Apr. 2020, the contents of which are hereby incorporated by reference in its entirety.

BACKGROUND

This disclosure pertains to the management of wireless devices in cellular, machine-to-machine, and other networks, such as those described in, for example: 3GPP TS 38.331, NR: Radio Resource Control (RRC) protocol specification, V15.8.0; 3GPP TS 38.321, NR; Medium Access Control (MAC) protocol specification, V15.8.0; R2-2001969 CR 38.321: Introduction of 5G V2X with NR sidelink; R2-2001966 CR 38.331: Introduction of 5G V2X with NR sidelink; R2-2002264 CR 38.300: Introduction of 5G V2X with NR sidelink; and 2GPP TS 38.214 NR; Physical layer procedures for data, V15.8.0.

SUMMARY

Mode 2 resource allocation is a distributed mechanism which relies on sensing to determine when a UE may transmit on the sidelink. It suffers from a number of drawbacks such as: power inefficiency, unused sidelink resources, and potential sidelink traffic collisions (for example resulting from hidden nodes). Assistance information may be used to address these drawbacks, whereby an assistant UE provides assistance information to a requester UE, which allows the requester UE to make better Mode 2 resource allocation decisions. Four exemplary types of assistance are proposed: blacklists, whitelists, resource allocations, and candidate resource sets.

The requester UE and the assistant UE may be configured for exchanging assistance information.

The requester UE may be configured to trigger requests for assistance. This may include mechanisms to determine which peer UEs to ask for assistance as well as mechanisms to send the assistance request to the assistant UE.

An assistant UE may be adapted to manage requests for assistance in a number of ways. This includes, for example, mechanisms to restrict which UEs are allowed to request assistance, mechanisms to trigger when to generate the assistance, mechanisms to generate the assistance information, and mechanisms to send the assistance response to the requester UE.

The requester UE may use the assistance information at the PHY layer and/or at the MAC layer, depending on the type of assistance, and use assistance information in preparing a sidelink grant for a particular destination.

For example, a UE acting as a requester UE and using resource allocation Mode 2 may send to a network an indication that the requester UE is capable of using assistance information and receive configuration information related to assistance information. The requester may then send an assistance information request to an assistant UE, receive the requested assistance information, and use the assistance information at the MAC layer to modify the candidate resource set and generate grants based in this modified candidate resource set.

The received assistance configuration may include a list of a second UE, triggers for sending assistance request, etc., and may be sent from a serving cell or an assistant UE. The assistance information request may include a type of assistance (blacklist, whitelist, resource allocation, candidate resource set, and measurement), a window over which assistance is to be provided, etc.

The requester UE may modify a candidate resource set by eliminating those candidate resources that are in a blacklist contained in the assistance information, or by including those candidate resources that are in a whitelist contained in the assistance information.

A UE acting as an assistant UE may send a capability indication to network signifying that the assistant UE is capable of providing assistance information. The assistant UE may then receive assistance configuration information. The assistant UE may use the configuration information, for example, in determining how to handle a received assistance information request, generating assistance information, and sending a response to the request.

The received configuration for the assistant UE may include, for example, a list of allowed requester UEs, periodicity of the assistance, type of assistance information, etc. The assistant UE may verify the request based on identity of requester UE, load on assistant UE, etc., and may generate the assistance information for the response based on a blacklist of slots, e.g., for those slots determined based on the inability of assistant UE to receive on the sidelink (due to sidelink DRX, half-duplex operation, transmission on the uplink, etc.)

A MAC layer at a UE using resource allocation Mode 2 may select a destination based on the logical channel with the highest priority and determine the configured sidelink grant for the destination using assistance information targeting the destination. The MAC layer may tag the sidelink destination to the configured sidelink grant and may build a MAC PDU using the configured sidelink grant for the tagged sidelink destination.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Table 1 of Appendix 3 of this disclosure describes some of the abbreviations used herein.

Sidelink Resource Allocation

Sidelink resource allocation refers to the process by which a UE determines the resources to use for sidelink transmission. 5G NR supports two basic modes of Resource allocation. Mode 1 is network controlled, whereby the base station schedules sidelink resource(s) to be used by UE for sidelink transmission(s). The UE has to be in RRC CONNECTED and UE has to be in coverage. Mode 2 is UE autonomous, whereby the base station does not schedule. Sidelink transmission resources are within sidelink resources configured by base station/network or pre-configured in the UE. UE may be in RRC CONNECTED, RRC IDLE, or RRC INACTIVE and UE may be in-coverage or out-of-coverage. The resources are selected from TX resource pools. This is in line with resource allocation modes defined for LTE D2D and LTE V2X.

Figure 1:
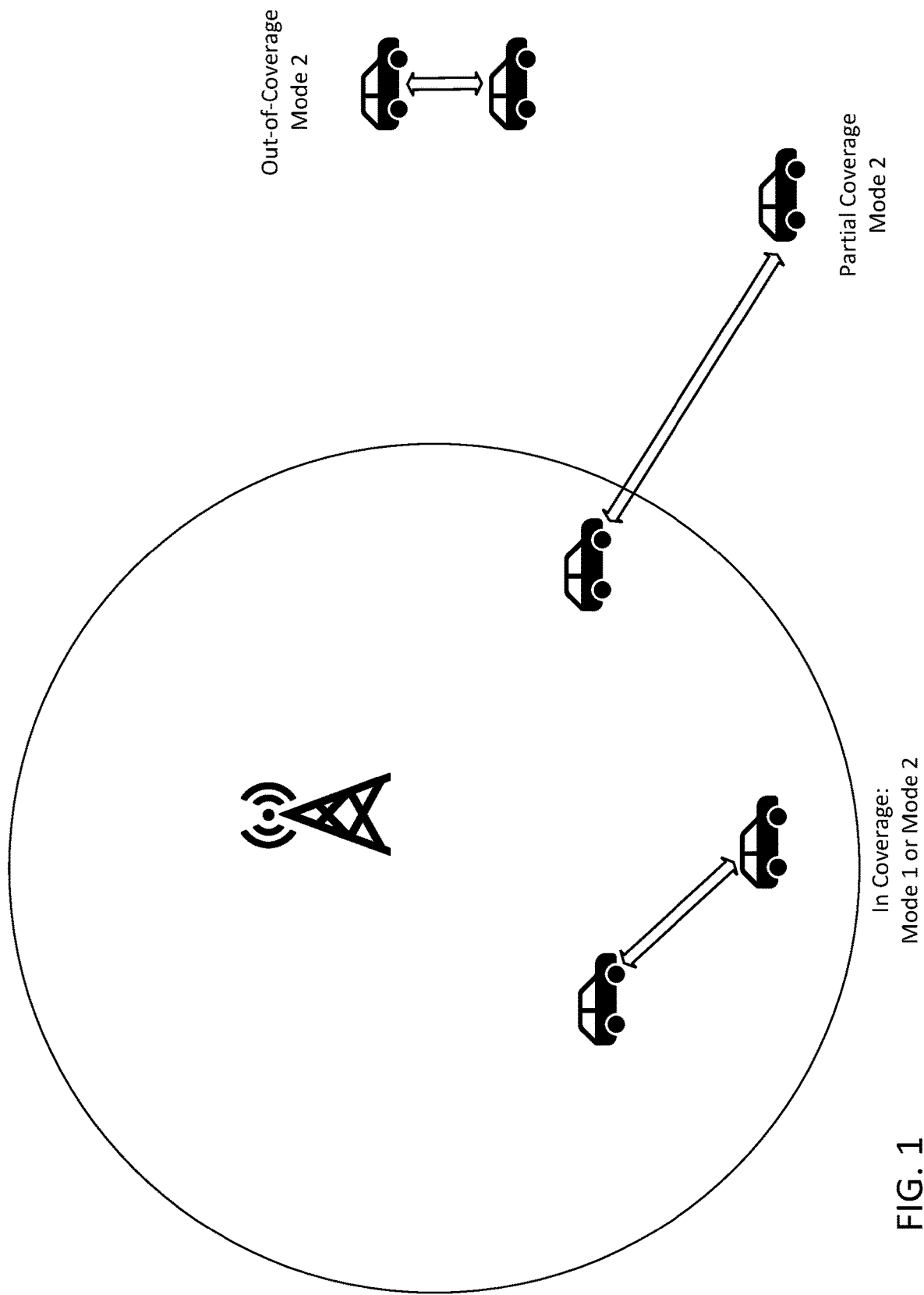
FIG. 1 illustrates an example of resource allocation for in coverage and out-of-coverage UEs.

FIG. 1 illustrates an example of resource allocation for in coverage and out-of-coverage UEs.

Release 17 Work Item

Release 17 has started an activity to enhance the Mode 2 Resource allocation. One of the objectives was to study the feasibility and benefit of the enhancement(s) in Mode 2 for enhanced reliability and reduced latency in consideration of both Packet Reception Ratio (PRR) and Packet Inter-Reception (PIR) and to specify the identified solution if deemed feasible and beneficial. PRR is a measure of reliability, and is calculated by determining the number of UEs receiving a packet in Range A divided by the number of UEs in a Range A. PIR is a measure of latency, defined as the time between successive successful receptions of two different packets. The inter-UE coordination enhancement was considered as a high priority. In inter-UE coordination, a set of resources is determined at UE-A. This set is sent to UE-B in Mode 2, and UE-B takes this into account in the resource selection for its own transmission.

Note that the standardization bodies did leave open the possibility of more enhancements to resource allocation.

The solution should be able to operate in-coverage, partial coverage, and out-of-coverage and to address consecutive packet loss in all coverage scenarios.

Figure 2:
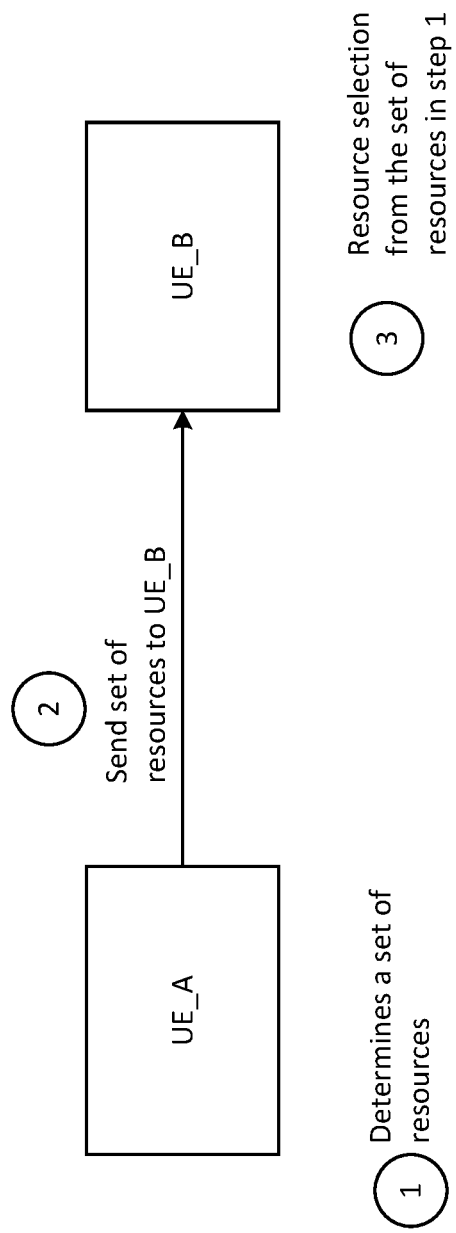
FIG. 2 illustrates an example of resource allocation with assistance information.

The goals of the enhanced resource allocation as depicted in FIG. 2 are to: reduce power consumption at UE_B; make sidelink communication from UE_B more reliable; and accommodate short latency for sidelink communication from UE_B.

Example Challenges

Figure 3A:
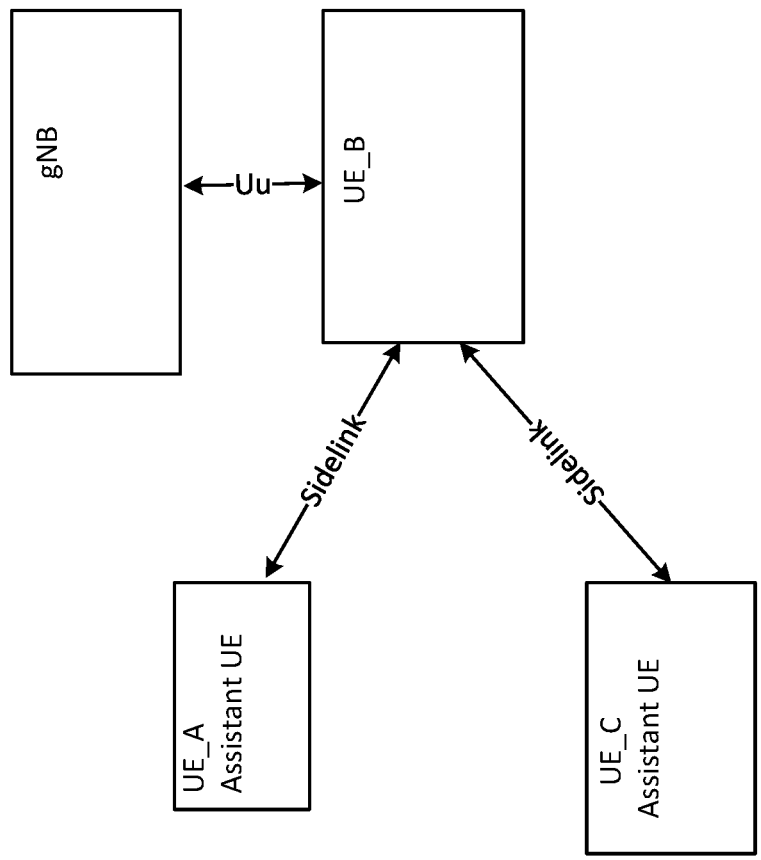
FIGS. 3A-3E illustrate an example of sidelink deployments.
Figure 3B:
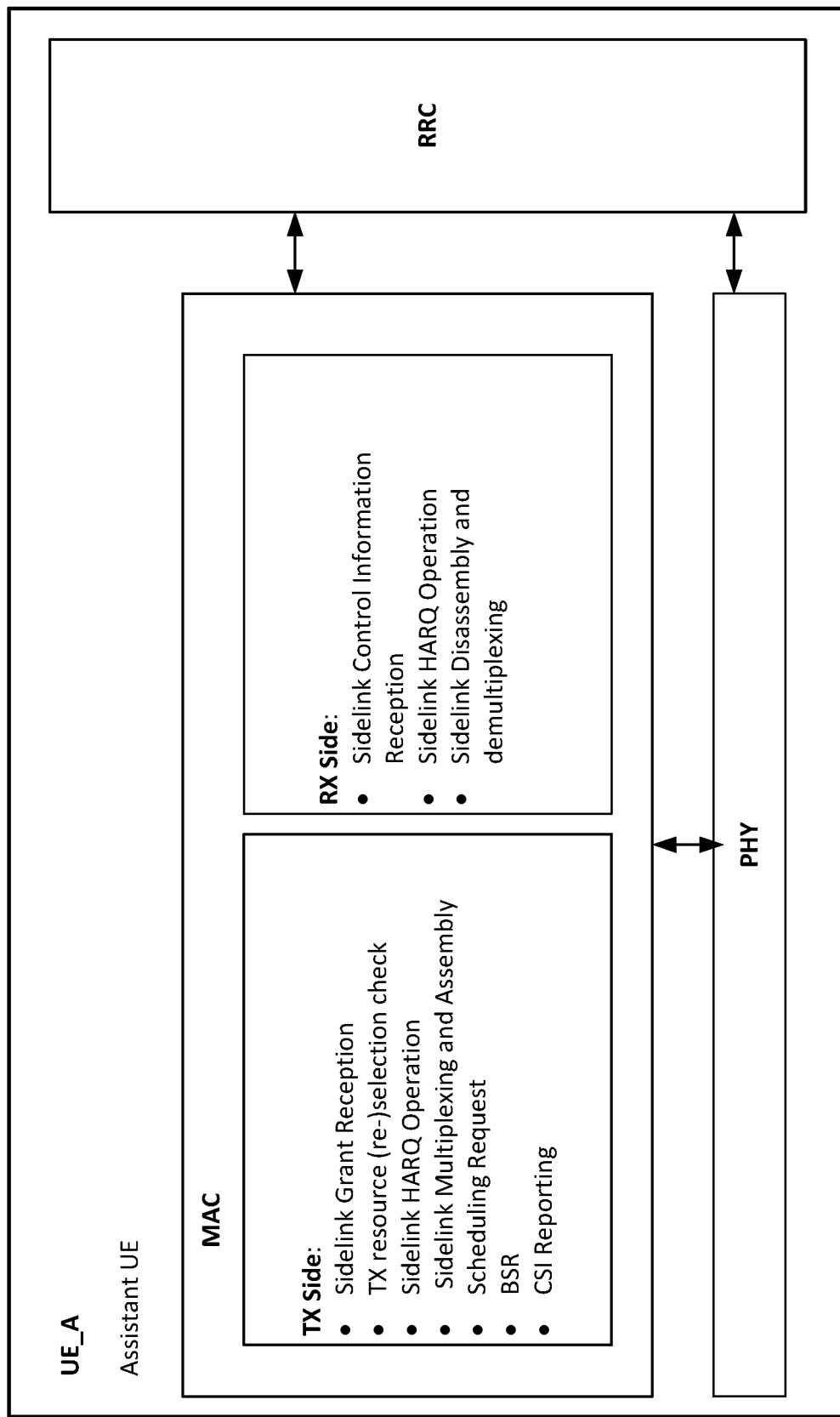
Figure 3C:
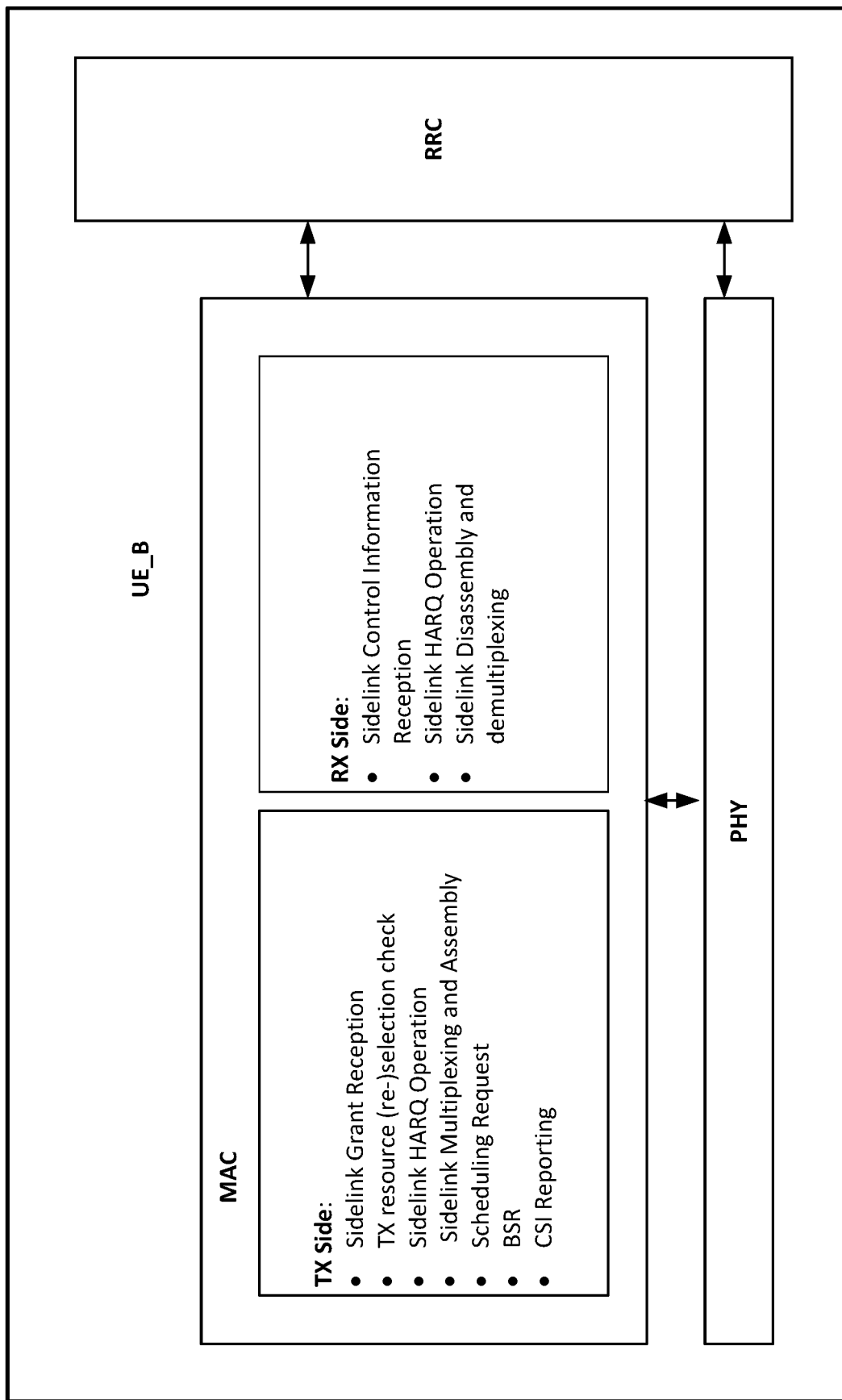
Figure 3D:
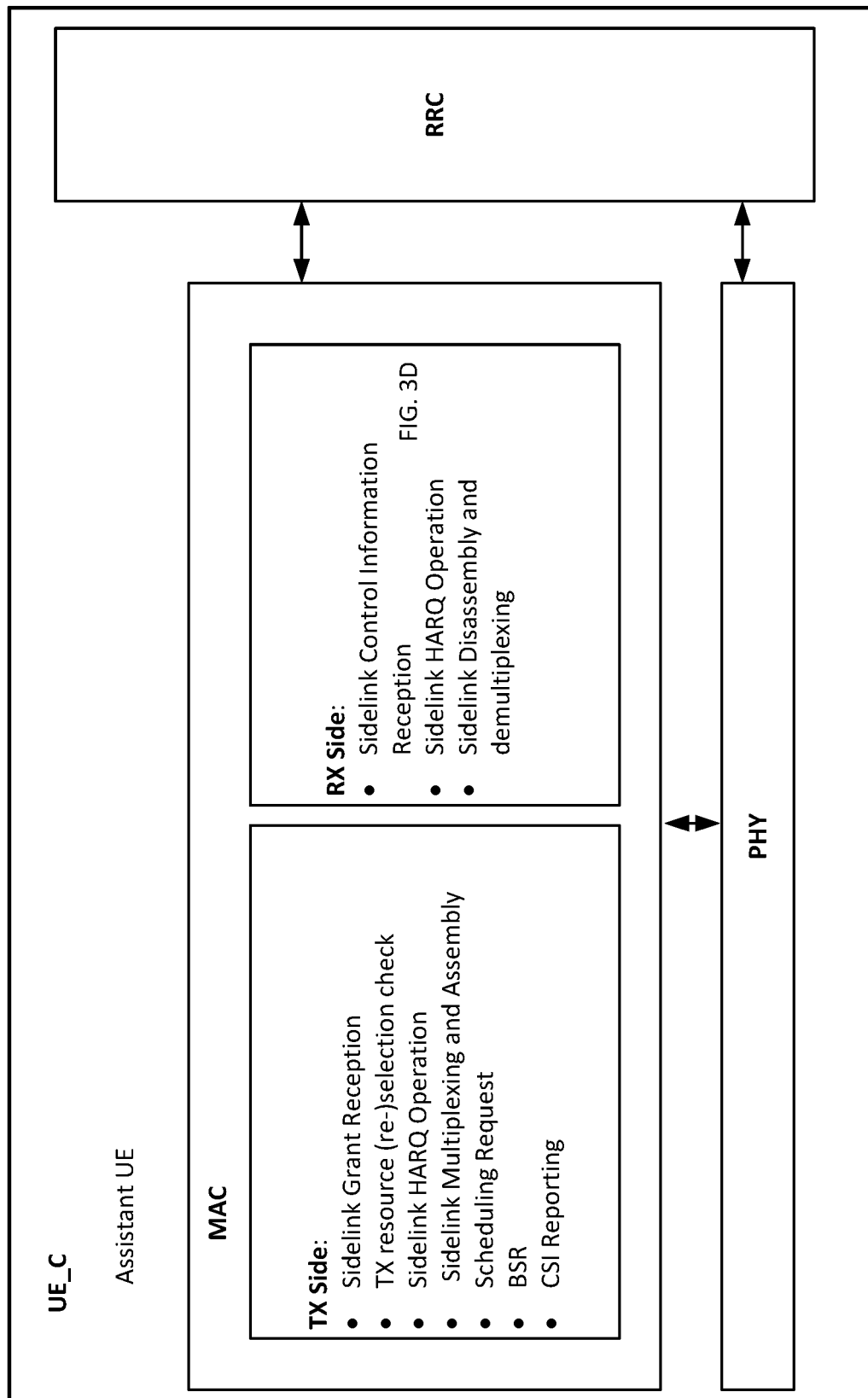
Figure 3E:
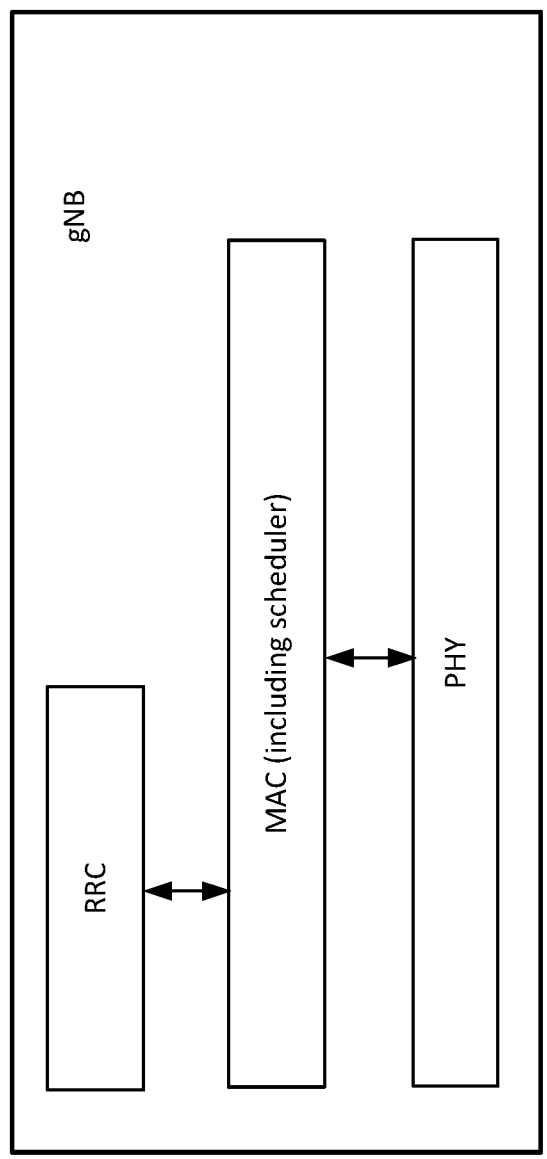

The proposed Release 17 enhancements to sidelink will permit deployments as shown in FIGS. 3A-3E. In FIG. 3A, a UE (UE_B) is served by a serving cell and has a Uu connection to a gNB. UE_B may use Mode 1 or Mode 2 resource allocation mode and may dynamically and semi-statically change from one resource allocation mode to another. Furthermore, when in Mode 2, UE_B may receive scheduling assistance from one or more assistant UEs (UE_A and UE_C). Example interior features of UE_A, UE_B, UE_C, and the gNB are illustrated in FIGS. 3B, 3C, 3D, and 3E, respectively.

The Medium Access Control (MAC) layer is responsible for data transfer on the sidelink Scheduled Channel (SL-SCH). It has a number of sub-processes/functions for transmission. Each of these sub-processes/functions is described with a dedicated section (shown in parenthesis) in the 3GPP TS 38.321, NR; Medium Access Control (MAC) protocol specification, V15.8.0. They are: Sidelink Grant Reception (5.x.1.1); TX resource (re-)selection check (5.x.1.2); Sidelink HARQ Operation (5.x.1.3); Sidelink Multiplexing and Assembly (5.x.1.4); Scheduling Request (5.x.1.5); Buffer Status Reporting (BSR) (5.x.1.6); and Channel State Information (CSI) Reporting (5.x.1.7)

In addition, the MAC layer has a number of sub-processes/functions for reception: Sidelink Control Information Reception (5.x.2.1); Sidelink HARQ Operation (5.x.2.2); and Sidelink Disassembly and demultiplexing (5.x.2.3).

The proposed sidelink enhancements will have an impact in the legacy (Release 16) sidelink resource allocation process. The basic process is shown in FIG. 4 in relation to UE_B.

Figure 4:
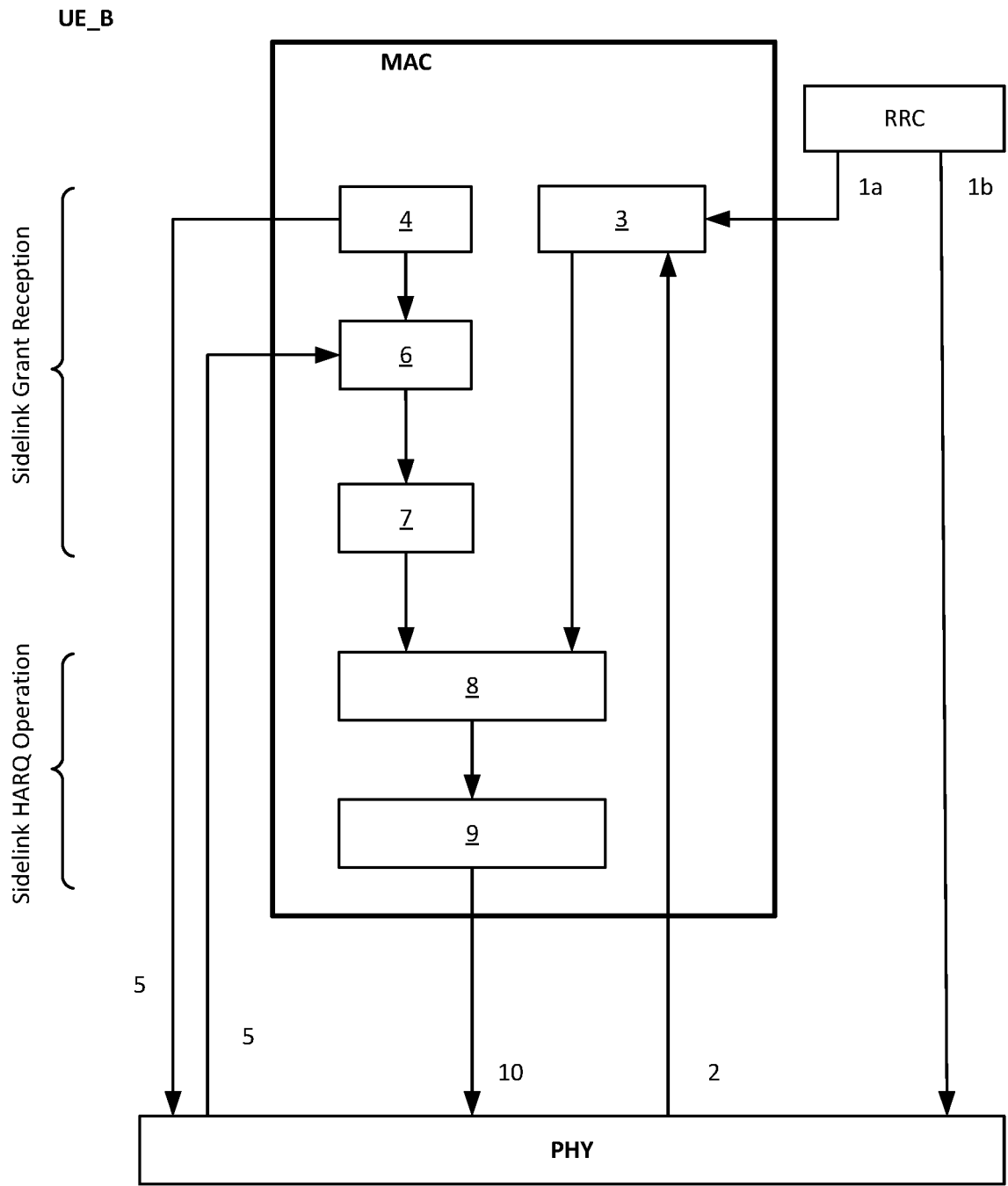
FIG. 4 illustrates an example of mode 1/mode 2 sidelink resource allocation.

In signaling 1a of FIG. 4, the RRC configures the MAC entity for sidelink operation. This includes if the MAC entity is to use resource allocation Mode 1 (either dynamic grants or configured grants) or resource allocation Mode 2 (either sensing based, or random access based). The random access based is targeting exception resource pools.

In signaling 1b, the RRC configures the PHY entity for sidelink operation. This includes the TX resource pool configuration, as well as Mode 1 configuration, and Mode 2 configuration. For the latter, the RRC may include the sensing configuration or random access.

In signaling 2, the PHY informs the MAC layer when it receives DCI in the PDCCH occasion.

The Sidelink Grant Reception determines the sidelink grant for UE_B. At the MAC layer, the transmission opportunities for these sidelink grants are referred to as PSCCH/PSSCH durations.

If configured for Mode 1 Operation, then in Step 3, the Sidelink Grant Reception determines if the PDCCH occasion has a sidelink grant. This is determined if the DCI is destined for SL-RNTI or SLCS-RNTI. The former is used for dynamic grants, while the latter is used for configured grant Type 2—namely activation, deactivation, or to schedule a retransmission for a Configured grant transmission.

Steps 4, 5, and 6 address Mode 2 Operation.

If configured for Mode 2 Operation, then in Step 4, the transmitting UE needs to continually evaluate which PSCCH/PSSCH durations may be used for a single MAC PDU transmission, for multiple MAC PDU transmissions, and the potential retransmissions of these MAC PDUs. To accomplish this, the Sidelink Grant Reception continually evaluates if TX resource (re)selection is necessary. Many triggers can tell the MAC layer that it needs to find new PSCCH/PSSCH durations. For example, triggering may occur if there is a reconfiguration of the Tx resource pools, there is new traffic that has no opportunity to be transmitted on sidelink, or the PSCCH/PSSCH durations have not been used for an extended period of time, etc.

In signaling 5, in order to assist the Sidelink Grant Reception, the MAC layer asks the PHY layer to provide a set of potential resources. These are provided by the PHY layer (either based on sensing or based on the configured exception resource pool). This is referred to as the candidate resource set.

In Step 6, the Sidelink Grant Reception randomly selects from this provided set of potential resources—in order to satisfy the transmission of one MAC PDU, multiple MAC PDUs, and the potential retransmissions of these MAC PDUs. The selected set denote the PSCCH/PSSCH durations for transmission.

In Step 7, at the PSCCH/PSSCH duration, the Sidelink Grant Reception selects the MCS for the sidelink grant, and then sends the sidelink grant, the selected MCS, and the associated HARQ information to the Sidelink HARQ Entity for this PSSCH duration.

In Step 8, the Sidelink HARQ entity, obtains the MAC PDU from Multiplexing and Assembly process. This is where Logical Channel Prioritization (LCP) occurs. The Sidelink HARQ entity, also determines the sidelink control information for MAC PDU, and then delivers the MAC PDU, the sidelink grant and the Sidelink transmission information to the associated Sidelink process.

In Steps 9 and 10, the Sidelink Process, at appropriate PSCCH/PSSCH duration, tells the PHY to transmit SCI, then tells the PHY to generate a transport block transmission. If HARQ is enabled, Sidelink Process also tells the PHY to monitor PSFCH.

Issue 1: Mode 2 Resource Allocation with Assistance

A first issue is that enhanced resource allocation is an important consideration for the automotive industry. These enhancements should be able to meet the latency and reliability requirements imposed by the use cases and should operate in both in-coverage and out-of-coverage scenarios. UE_A provides resource allocation assistance to UE_B. This assistance may come in many forms: sensing assistance, list of allocated resources, list of blacklisted resources, etc. A number of problems need to be addressed for Issue 1.

In the following, it is assumed that UE_B is configured for Mode 2 resource allocation and has SL data available in one or more logical channels. It may use assistance information to assist with Mode 2 resource allocation.

Problem 1—Resource Allocation and MAC PDU

Herein, Problem 1 refers to a lack of coordination between resource selection and MAC PDU assembly. In Release 16 sidelink communication, the Sidelink Grant Reception determines the PSCCH and PSSCH durations to use for sidelink traffic (Step 6 in FIG. 4). At these PSCCH/PSSCH durations the Multiplexing/Assembly functionality builds a MAC PDU for transmission (Step 8 in FIG. 4). The Multiplexing and Assembly process selects the destination based on the logical channel having the highest priority. The PSCCH/PSSCH durations are determined without knowing the destination of the SL data, as this is selected only during Multiplexing/Assembly. However, some of the assistance information may be for a specific destination. For example, a whitelist of slots for a specific Layer 2 Destination ID. Sidelink Grant Reception and Multiplexing/Assembly function need to take this per destination assistance information into account. If not, the Multiplexing/Assembly may create a MAC PDU which uses a slot that was in the whitelist for another destination.

Problem 2—Sidelink Grant Reception

Figure 5:
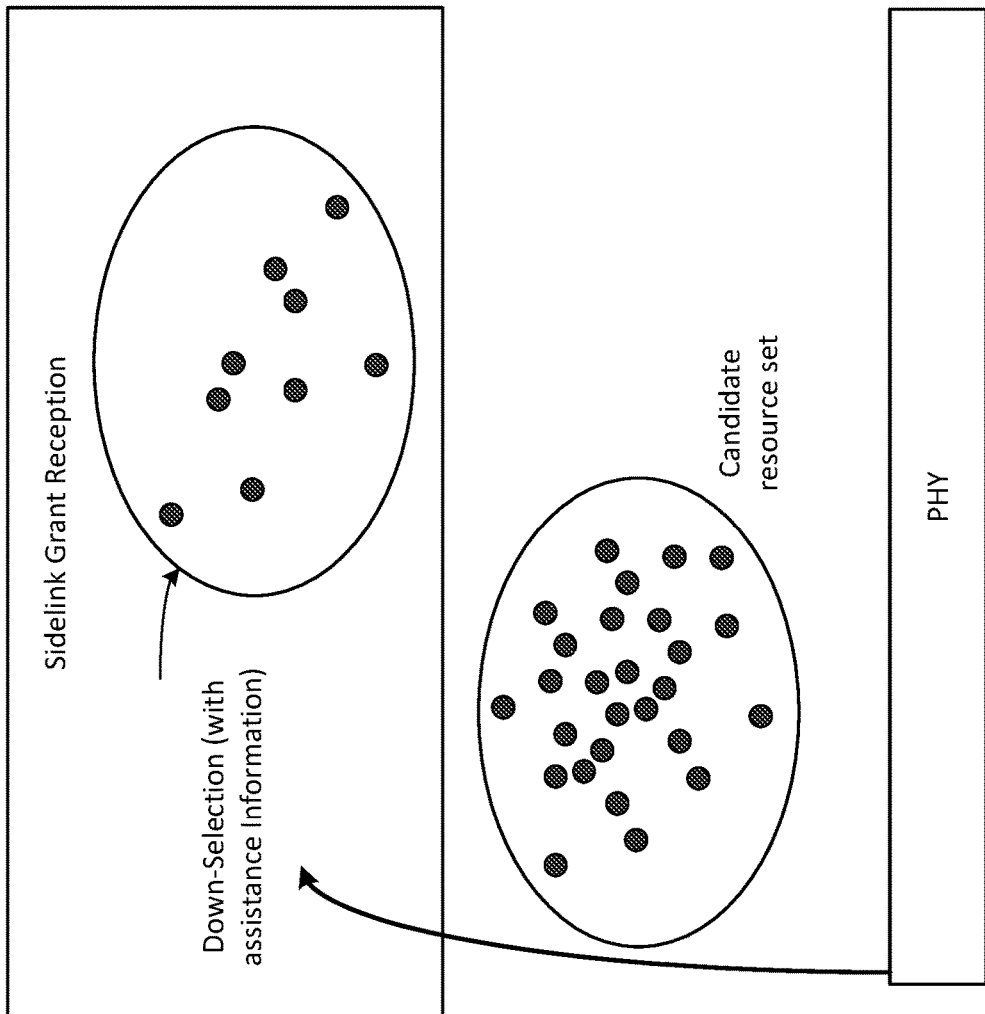
FIG. 5 illustrates an example of down-selection with assistance.

Problem 2 involves issues with sidelink grant reception. The assistance information is provided to help UE_B determine the transmission opportunities. These opportunities are selected in Step 6 of the process in FIG. 4, after the Sidelink Grant Reception is provided a set of candidate resources from the PHY layer. In the legacy procedure, the Sidelink Grant Reception randomly selects the opportunities from the list provided by the PHY layer. However, at Step 6, the Sidelink Grant Reception may want to down-select from the list provided by the PHY layer by using some assistance information. See FIG. 5. The triggers for this down-selection need to be defined. In addition, if UE_B does not have the needed assistance information, the MAC layer may trigger a request for this information from one or more peer UEs. No current mechanism exists to request this assistance information. In addition, UE_B may not know which peer UE to ask for assistance.

Problem 3—Coordination of Assistance Information

Problem 3 involves issues with the coordination of assistance information. During the proposed down-selection in Step 6 of the Sidelink Resource Allocation process, the Sidelink Grant Reception may use the assistance information to down-select from the list of candidate resources provided by the PHY layer. The actions associated with the down-selection operation need to be defined. These actions may depend on the type of the assistance information that is available:

If assistance information has a whitelist of candidate resources from a peer UE, how does down-selection take this into account. For example, considering the candidate resources provided by the PHY layer of the UE.

If assistance information has a blacklist of candidate resources from a peer UE, how does down-selection take this into account. For example, how to avoid the candidate resources in the blacklist that are in the candidate resources provided by the PHY layer of the UE.

If assistance information has a sidelink grant from a peer UE, how does down-selection take this into account. For example, considering the candidate resources provided by the PHY layer of the UE.

If assistance information has candidate resource set results from a peer UE, how does down-selection take this into account. For example, considering the sensing performed by the PHY layer of the UE.

Furthermore, the UE may have one or more multiple assistance information from one or more multiple peer UEs. The Sidelink Grant Reception has to determine which assistance information to use, how to combine multiple assistance information, and how to deal with conflicting assistance information.

Problem 4—Assistant UE Functionality.

Problem 4 involves new functionality at assistant UEs. The assistant UEs may need to provide assistance to one or more other UEs. The MAC layer of these assistant UEs needs to manage requests for assistance and send the response back to the requesting UEs. Five questions need to be addressed.

First, assistant UEs should be able to select the peer UEs for which it provides assistance. If not, assistant UEs would have to serve all assistance information requests. How does an assistant UE know whether or not to provide assistance information to a peer UE?

Second, when is a UE triggered to provide assistance information?

Third, if an assistant UE receives multiple triggers for assistance information request, how does it prioritize one over the other?

Fourth, how does the assistant UE send the assistance information response back to the requesting UE?

Fifth, the actions associated with a UE being triggered to provide assistance information need to be defined. These actions may depend on the type of the assistance information that is requested. If requested assistance information is a whitelist of candidate resources, MAC layer may need to consider any configured sidelink grants as well as sensing information from its PHY layer.

If requested assistance information is a blacklist of candidate resources, MAC layer may need to consider any configured sidelink grants as well as sensing information from its PHY layer.

If requested assistance information is a sidelink grant for the requesting UE, MAC layer may need to offer a Scheduler functionality.

If requested assistance information is sensing results, MAC layer may need to coordinate sensing with the PHY layer.

Types of Assistance Information

An assistant UE may provide one or more types of assistance information to requester UEs. Here we describe five exemplary categories/types of assistance. Hereinafter, only these five types of assistance information are described. However, it should be understood that the solutions in the detailed description applies to other forms of assistance information. Five forms follow.

First is whitelist information. Assistance information may be in the form of whitelists. The whitelist may represent a set of slots or subchannels or beams. In one option. the whitelist is a preference or recommendation of slots/subchannels/beams that the requester UE should favor during its resource allocation process. The requester UE may continue to choose slots/subchannels/beams out of this whitelist. In another option, the whitelist is a slot/subchannel/beam limitation. The requester UE should only make its resource allocation from this set. The whitelist information may be provided over an observation window.

Second is blacklist information. Assistance information may be in the form of blacklists. The blacklist may represent a set of slots or subchannels or beams. The requester UE should not transmit in the slots or subchannels or beams on the blacklist. The blacklist information may be provided over an observation window.

Third is resource allocation information. Assistance information may be in the form of a resource allocation to a requester UE. The resource allocation information may be provided over an observation window.

Fourth is candidate resource set information. Assistance information may be in the form of a candidate resource set. For example, the assistant UE may be a dedicated UE that provides candidate resource set information to other UEs that have no sensing capability. Similarly, the assistant UE may provide candidate resource set information to UEs that have power limitations and can only perform partial sensing. These assistant UEs may continually sense the channel and determine the candidate resource set. The sensing could be over the entire channel, over all transmit resource pools, or over only some transmit resource pools. The candidate resource set information may be provided over an observation window, and the resources may be defined at the granularity of a subchannel.

Fifth is measurement information. Assistance information may be in the form of measured Reference Signal Receive Power (RSRP) or Signal-to-noise-plus-interference ratio (SINR) in particular resources. The particular resources may be the resources in the blacklists or whitelist.

Solutions for Issue 1: Mode 2 Resource Allocation with Assistance

Figure 6:
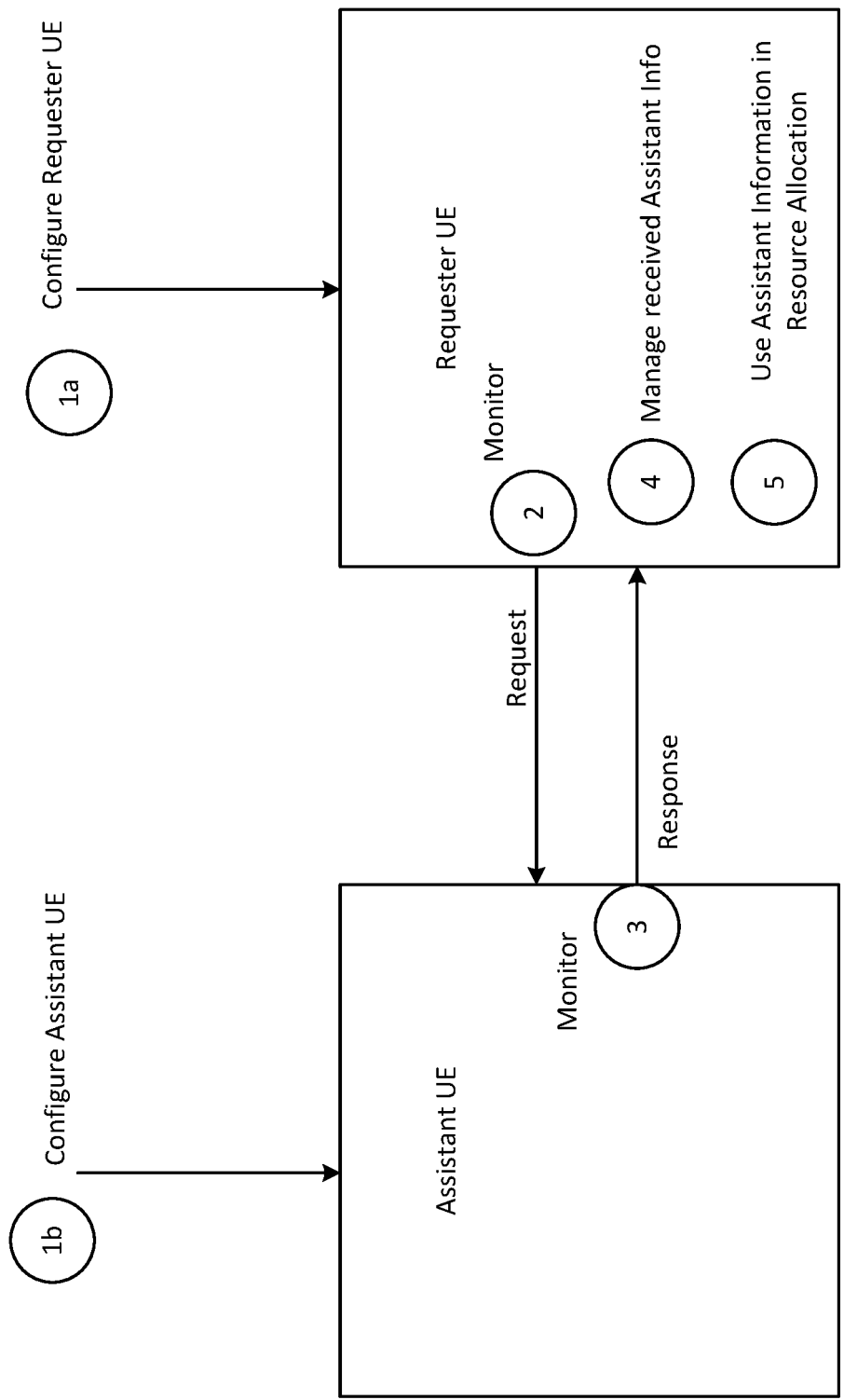
FIG. 6 illustrates an example of requester UE/assistant UE interaction.

There are various steps involved for a requester UE to use assistance information, as illustrated in FIG. 6. In Step 1a, requester UE is configured with information related to operation with assistance information. In step 1b, assistant UE is configured with information related to operation with assistance information. In Step 2, requester UE monitors conditions to determine when it needs to request assistance from an assistant UE. In Step 3, assistant UE monitors conditions to determine when it needs to send assistance to a requester UE. In Step 4, requester UE receives assistance information from an assistant UE Step 5: requester UE uses the assistance information in its Mode 2 Resource Allocation.

Step 1a/1b: Configuration of Assistance Information

The procedures in this section address questions identified in Problem 2 and Problem 4. The requester UE and assistant UE need to be configured to allow the Resource Allocation with Assistance.

The requester UE may be configured through pre-configuration, configuration, signaling from the serving cell, signaling from a Controller UE, or system information. A Controller UE is a UE that provides control information to one or more sidelink UEs. It is expected to be used in out-of-coverage scenarios but may also be used in in-coverage scenarios. The controller UE could be the assistant UE or another UE. The configuration may also be negotiated between the requester UE and the assistant UE. This negotiation may occur during PC5-S link establishment, PC5 RRC connection establishment, UE sidelink capability exchange, UE sidelink configuration exchange, or a new dedicated RRC exchange between the requester UE and the assistant UE. The configuration information may include one or more of the following six items.

First is whether the UE is allowed to be a requester UE. For example, upon a handover to a new cell, the target gNB may decide that it does not want UEs to exchange assistance information. The UEs would be configured to not request assistance information.

Second is a list of assistant UEs. This may be a list of Layer 2 IDs, or Application IDs.

Third is a trigger for an assistance request. The requester UE may be configured to request the assistance information with a certain periodicity. For example, through an assistancePeridocity parameter. The requester UE may be configured to request this information based on request from higher layers. The requester UE may be configured to request this information based on some internal trigger from the RRC, MAC layer or PHY layer Fourth is maxCandidateResourceSet, the maximum size of the candidate resource set provided by the PHY layer. If the size of the candidate resource set exceeds this maximum, the requester UE may seek out assistance information.

Fifth is minCandidateResourceSet, the minimum size of the candidate resource set provided by the PHY layer. If the size of the candidate resource set is lower than this minimum, the requester UE may seek out assistance information.

Sixth is minRequestTime, the minimum time interval between transmission of Assistance requests. This may be used to guarantee a certain prohibit time after a requester UE sends a request.

The assistant UE may be configured through (pre-)configuration, through signaling from the serving cell, through signaling from a Controller UE, or through system information. The configuration may also be negotiated between the requester UE and the assistant UE. This negotiation may occur during PC5-S link establishment, PC5 RRC connection establishment, UE sidelink capability exchange, UE sidelink configuration exchange, or a new dedicated RRC exchange between the requester UE and the assistant UE. The configuration information may include one or more of the following eight items.

First is whether the UE is allowed to be an assistant UE. For example, upon a handover to a new cell, the target gNB may decide that it does not want UEs to exchange assistance information. The UEs would be configured to not send assistance information.

Second is a list of allowed Requesters. This may be a list of Layer 2 IDs, or Application IDs. An assistant UE will only respond to Assistant requests or send assistance to UEs on this list. For each requester UE, the configuration may include the type of assistance to provide for this Requester (for example a blacklist, a whitelist, a resource allocation, or a candidate resource set).

Third is a trigger for an assistance request; The assistant UE may be configured to send the assistance information with a certain periodicity. For example, through an assistancePeridocity parameter. The assistant UE may be configured to send this information based on request from higher layers. The assistant UE may be configured to send this information based on some internal trigger from the RRC, MAC layer or PHY layer. For example, based on measured RSRP, SINR, etc. The assistant UE may be configured to send the assistance information, if this information has changed by more than a (pre)configured delta, or crosses a (pre)configured threshold. In such a case the UE would be configured with this delta or threshold. The assistant UE may be configured to send the assistance information semi-persistently. The UE may be configured with the details of this semi-persistence.

Fourth is a type of assistance information requested (for example: whitelist, backlist, candidate resource set, resource allocation, measurement results (such as RSRP or SINR) for a set of resources), as well as the details of the assistance information. Some of the details may include thresholds that trigger monitoring and/or transmission of assistance information, timers related to the assistance information. For example, the assistant UE may be configured to provide the assistance information for an observation window. For example, for a period of K slots, where K is configured. Furthermore, how the assistance information is to be provided—this could be per slot or per subchannel.

Fifth are details related to the assistance information to provide. For example, the TX resource pools to be monitored Sixth are any constraints imposed on the assistance information. For example, the requester UE may have sidelink DRX configured and it will not monitor the sidelink during these DRX slots. As another example, the requester UE may not permit simultaneous uplink and sidelink transmission.

As a result, the requester UE may provide an indication of the configured grants for its uplink transmissions. As another example, the UE may be configured with measurement gaps to perform inter-frequency measurements. The requester UE may provide an indication of this measurement gap configurations.

Seventh, if the assistance information is a resource allocation, the configuration may also include scheduling information to assist the assistant UE in providing the resource allocation. This may include the requested amount of resources, the identity of the destination UE that will receive the sidelink transmission of the requester UE, and any transmit restrictions of the requester UE (for example slots where the requester UE may not transmit).

Eight is a parameter to indicate whether assistance information is broadcast to all sidelink UEs or unicast to specific requester UEs. The assistant UE may also be configured with the broadcast address. Note that this configuration may be for all assistance information generated by this assistant UE, or for specific types of assistance information.

Note that the UEs may need to signal to the network their capability to behave as a requester UE or assistant UE. It is proposed that this capability be added as a new UE capability and provided to the serving cell in a UECapabilityEnquiry exchange, a new RRC message exchange, or a NAS layer message exchange. For example, this may be in a new assistance-Parameters IE that is included in the UECapabilityInformation message.

Step 2: Monitoring at Requester UE

A number of sub-problems need to be addressed in order for the Sidelink Resource Allocation process to use assistance information at the requester UE, as identified in Problem 2.

Initially, the MAC layer may need to determine when to use assistance information. A number of events may occur at the requester UE that trigger the use of assistance information. For example, one or more of the following six triggers to use assistance information may occur:

First, during the Sidelink Grant Reception process, the candidate resource set may be too large. The requester UE may be configured with a maxCandidateResourceSet. When the PHY layer returns the candidate resource set (Step 5 in FIG. 4), the MAC layer may determine if the number is greater than maxCandidateResourceSet. If so, the MAC layer may be triggered to use assistance information to reduce this set.

Second, during the Sidelink Grant Reception process, the candidate resource set may be too small. The requester UE may be configured with a minCandidateResourceSet. When the PHY layer returns the candidate resource set (Step 5 in FIG. 4), the MAC layer may determine if the number is less than minCandidateResourceSet. If so, the MAC layer may be triggered to use assistance information to reduce this set.

Third, during the Sidelink Grant Reception process the PHY layer may return an indication of the threshold used to determine the candidate resource set (Step 5 in FIG. 4). Alternatively, this could be an indication of the number of times the candidate resource set size was the less than 20% of the entire selection window, and the sensing threshold had to be increased. If so, the MAC layer may be triggered to use assistance information to reduce this set.

Fourth, during the Sidelink Grant Reception process the PHY layer may return the candidate resource set (Step 5 in FIG. 4) and an indication that the set is derived from the exception resource pool. If so, the MAC layer may be triggered to use assistance information to reduce this set.

Fifth, during the Sidelink Grant Reception the MAC layer may always use assistance information for resource allocation Mode 2.

Sixth, during the Multiplexing and Assembly process, the requester UE has triggered the use of assistance information for a particular Destination. This assistance information will be used in a subsequent determination of a sidelink grant.

Next, the MAC layer may need to determine when to request assistance information from a peer UE. The following four triggers may be used.

First, the MAC layer at the requester UE may be triggered to use assistance information to reduce the candidate resource set provided by the PHY layer (Step 5 in FIG. 4), and it may not have assistance information. This may trigger the requester UE to request assistance.

Second, upon request from the upper layer: The requester UE may receive an indication from the upper layers to use assistance information. The upper layer may provide an indication of the type of information to use as well as the identity of the one or more assistant UEs to provide this information.

Third, upon establishment of a PC5 RRC connection to a peer UE: The peer UE may provide an indication that it may provide assistance as part of its capability exchange. Alternatively, the peer UE may be on the (pre)configured list of assistant UEs that is maintained by the requester UE.

Fourth, currently saved assistance information at the requester UE may have expired or is about to expire.

Next, the requester UE may need to determine which peer UEs to ask for assistance information. The requester UE may have a list of assistant UEs and the assistance information that each of these may provide. This list may be established through (pre)configuration at the requester UE. Alternatively, the requester UE may maintain this list based on a discovery procedure. As another alternative, the requester UE may maintain this list based on the capability exchange during PC5 RRC connection setup procedure. This may be through a new assistantInfo IE in the UECapabilityInformationSidelink message. The assistantInfo IE may include information as to the type of assistance the peer UE may provide. For example: blacklist, whitelist, resource allocation, candidate resource set, and/or measurements. Based on this list, the requester UE needs to determine which peer UE to ask for assistance. The requester UE may make this determination based on the type of assistance information. For example, the requester UE may need blacklist information only to one particular peer UE. In such a case, the requester UE would only target assistance from this particular peer UE. As another example, if the requester UE may need candidate resource set information, the requester UE may target all peer UEs in the list of assistant UEs. If the requester UE needs to contact a peer UE on the list of assistant UEs for which it has no PC5 RRC connection, the requester UE may establish a PC5 RRC connection to this peer in order to obtain the needed assistance.

For the selected assistant UEs, the requester UE may send a request for assistance information. This request may be sent via one of the following three mechanisms:

First is via an RRC message, for example a new RRCAssistantInformationRequest message or as part of a new IE in the RRCReconfigurationSidelink message or UECapabilityEnquirySidelink message.

Second is via a MAC CE message, such as an assistance information reporting request message.

Third is via a field in the Sidelink Control Information (SCI). For example, the SCI may have an assistance information reporting field. SCI has 2 stages. A 1st stage SCI using SCI format 0-1 which is used for the scheduling of PSSCH and a 2nd stage SCI using SCI format 0-2 which is used for the decoding of PSSCH. The assistance information reporting field may be carried in one of these two stages. For example, in the 2nd stage SCI format 0-2.

The request may include the following five items of information.

First is a type of assistance information requested. For example, blacklist, whitelist, resource allocation, candidate resource set, and/or measurements (such as RSRP or SINR) on specific resources.

Second is the window over which the assistance information is to be provided. The requester UE may ask that the assistance information be provided for a certain number of slots. For example, the blacklist information may be provided for K consecutive slots.

Third is the periodicity of the assistance information. The requester UE may ask that the assistance information be provided with a certain periodicity. For example, the assistance information may be provided every M slots.

Fourth is a rule or set of rules, parameters, thresholds, etc., for assistant UEs to follow and/or act/react for sending assistance information.

Fifth is guidance for the assistant UE. For example, the requester UE may tell the assistant UE three things.

First are metrics the requester UE wants to optimize (such as latency, reliability, both latency and reliability, power savings, or any combination of them, etc.) as well as potential requirements on these metrics.

Second are limitations of the requester UE. For example, the requester UE may provide its TX resource pools Third are any constraints imposed on the assistance information. For example, the requester UE may have sidelink DRX configured and it will not monitor the sidelink during these DRX slots. As another example, the requester UE may not permit simultaneous uplink and sidelink transmission. As a result, the requester UE may provide an indication of the configured grants for its uplink transmissions. As another example, the UE may be configured with measurement gaps to perform inter-frequency measurements. The requester UE may provide an indication of this measurement gap configurations.

Step 3: Monitoring at Assistant UE

A number of sub-problems need to be addressed in order for the assistant UE to provide assistance information, as identified in Problem 4. In a first sub-problem, the UE may need to determine when to monitor or evaluate or send the assistance information for/to the requester UE. The assistant UE may use one or more of the following seven triggers:

First, the assistant UE may send the assistance information periodically to the requester UEs or broadcast this information. The periodicity may be based on the configured assistancePeridocity parameter. At expiry of the timer, the assistant UE may determine the assistance information and send it to the requester UEs or broadcast this information.

Second, the assistant UE may send the assistance information semi-persistently based on a configured pattern.

Third, the assistant UE may monitor one or more metrics and send the assistance information when this monitored metric changes by more than a configured threshold. For example, the assistant UE may monitor the number of slots that have become blacklisted since the last time the assistance information was sent. If this number is above a (pre)configured threshold, the assistant UE may be triggered to send an update to the requester UE.

Fourth, the assistant UE may receive a request to send assistance information from a requester UE. This request may be over an RRC message (for example the RRCReconfigurationSidelink, RRCReconfigurationCompleteSidelink, UECapabilityEnquirySidelink, UECapabilityInformationSidelink messages, or a new RRC message), a MAC CE, or an SCI.

Fifth, the assistant UE may receive a request to send assistance information from a Controller UE. This request may be over an RRC message, a MAC CE, or an SCI.

Sixth, the assistant UE may receive a request to send assistance information from its serving cell. This request may be over an RRC message, a MAC CE, or an DCI.

Seventh, the assistant UE may receive a request to send assistance information from its upper layers. For example, after a PC5-S connection is established, the upper layer may trigger the assistant UE to send assistance information.

Note that these trigger mechanisms may be combined. For example, the requester UE may provide a periodicity value through an RRC message and have the periodic transmission of the assistance information activated/deactivated through an SCI message.

In a first second sub-problem, upon reception of the request, the assistant UE may need to determine if the requester UE is allowed to request assistance. The assistant UE may be configured with an allowedRequester list. This list may be (pre)configured, configured through signaling with serving cell, configured through signaling with a Controller UE, configured through system information, or negotiated with peer UEs. Upon reception of a request for assistance information, the assistant UE may first check if the requester UE is on the allowedRequester list. If so, the assistant UE proceeds with providing the requested assistance. If not, the assistant UE may disregard the request. Alternatively, it may send a failure indication to the requester UE so that it is aware that the request has failed and that no assistance is forthcoming. The requests may have an associated priority and type. The assistant UE may use this to determine whether to accept or reject a request. For example, an assistant UE may be assisting many peer UEs. It may determine that it does not want to process any further requests and may reject any future requests. Alternatively, upon receiving an incoming request of high priority, the assistant UE may cancel an existing request of lower priority.

In a third sub-problem, when the assistant UE is triggered to provide assistance, the actions taken depend on the type of assistance. Some of these actions are described below for the following five types of assistance information: blacklist, whitelist, resource allocation, and candidate resource list.

First is blacklist. The assistant UE may determine all the slots or subchannels or beams for which it does not want to receive sidelink transmissions from the requester UE or from any peer UE. These slots and subchannels are determined in the configured resource pool to monitor and for the configured observation window. This assistant UE may make this decision based on load balancing reasons. For example, the assistant UE may want to segregate traffic from certain UEs to only occur in certain slots. Alternatively, the assistant UE may blacklist certain slots since it will be unable to receive sidelink transmissions in these slots. For example, the assistant UE may have Sidelink DRX configured during these slots, or assistant UE may have a measurement gap configured during these slots, or assistant UE may have a configured grant for sidelink transmission scheduled for this slot (some UEs will have a half-duplex limitation, and they cannot receive and transmit on the sidelink at the same time), or assistant UE may have a configured grant for uplink transmission scheduled for this slot (some UEs will not be able to simultaneously transmit on uplink and receive on sidelink). Alternatively, the assistant UE may blacklist certain beams. For example, it may know that transmission in that beam is very poor.

Second is whitelist. The assistant UE may determine all the slots or subchannels or beams for which it prefers to receive sidelink transmissions from the requester UE or from any peer UE. These slots/subchannels/beams are determined in the configured resource pool to monitor and for the configured observation window. This assistant UE may make this decision based on load balancing reasons. For example, the assistant UE may want to segregate traffic from certain UEs to only occur in certain slots. Alternatively, the assistant UE may whitelist certain slots so that it may schedule when it may go into sidelink DRX.

Third is a candidate resource set. The assistant UE may inform the PHY layer to return a candidate resource set. The assistant UE may provide the following information to the PHY layer to assist in the sensing: the sensing window size (if not provided, the PHY layer may use a (pre)configured default size), the TX resource pool over which the candidate resource set is to be determined. The PHY layer would then return the candidate resource set information, with candidate resources identified on a subchannel level.

Fourth is resource allocation. The assistant UE may determine the resources to assign to the requester UE, based on the scheduling information provided by the requester UE. The assistant UE may take into account the amount of resources requested. The assistant UE may take into account the slots or subchannels over which the requester UE may not transmit. For example, the requester UE may already have a grant for UL transmission or sidelink transmission during these slots or subchannels. The requester UE may take into account the subchannels or slots where the Destination UE for the sidelink transmission may not receive sidelink transmissions. For example, the requester UE may want to send sidelink traffic to a destination UE (the destination UE may be the assistant UE or another peer UE). The assistant UE could allocate resources so that these are transmitted while the Destination UE is receiving sidelink transmissions.

Fifth is measurements (such as RSRP, SINR) on selected resources. The assistant UE may retrieve the measurement results either from the PHY or RRC layer. The assistant UE may have to configure these measurements if they are not already being monitored.

In a fourth sub-problem, the assistant UE must send the assistance information response to the requester UE. This response may be sent via one of five mechanisms.

First is via an RRC message, for example new RRCAssistantInformationResponse message or as part of a new IE in the RRCReconfigurationSidelink message or UECapabilityEnquirySidelink message.

Second is via a MAC CE message. For example, an assistance information Reporting response message.

Third is via a field in the Sidelink Control Information (SCI). For example, the SCI may have an assistance information Reporting field.

Fourth is via the sidelink feedback channel (PSFCH).

Fifth is via the sidelink shared channel (PSSCH).

The response may include the requested assistance information (for example: blacklist, whitelist, candidate resource set, resource allocation, measurements). This assistance information may also include a validity period. This validity period may include a start time and a duration (for example in slots). If the assistant UE has multiple pending response messages to send, these may be prioritized depending on the type of assistance information and/or the configuration of the assistance information. The assistance information may be sent to only the requester UE, or broadcast to all UEs. This may depend on the type of assistance information. For example, the candidate resource set information may be broadcast to all UEs, so that this information may be used during the Sidelink Grant Reception process at these UEs. In cases where there are multiple requests from multiple requester UEs, the assistant UE may combine the assistance information and transmit the information to all of Requestor UEs together, rather than transmitting this information separately to each of the individual requester UEs. That is, the assistant UE may multiplex multiple assistance information and transmit via groupcast or broadcast.

Step 4: Managing Received Assistance Information at Requester UE

A requester UE may receive assistance information from multiple destinations. This information has to be managed at the requester UE. The information may be received via an RRC message, a MAC CE, or an SCI. The requester UE may store this assistance information at the MAC layer. The following types of assistance information may be received: blacklist, whitelist, resource allocation, candidate resource set, measurements, etc. Each of these may have a validity period, denoting the period over which the information is valid. This period may contain a start and a duration (for example in terms of number of slots). Each of these may also have an associated priority. The priority of the assistance information may take a number of forms.

First, the priority may be (pre)configured in the standard. For example, the priority of the assistance information may always be resource allocation assistance information>candidate resource set assistance information>blacklist assistance information>whitelist assistance information Second, the priority may be based on the remaining lifetime of the assistance information. For example, if assistance information is about to expire, the assistance information may have a higher priority.

Third, the priority may be based on the freshness of the assistance information. For example, the recently received assistance information may be more accurate than assistance information received many slots before.

Fourth, the priority may be based on a priority provided by the assistant UE.

Upon reception of the assistance information, the requester UE attempts to combine this information with already stored assistance information. For example, it may combine the candidate resource set Information from multiple assistance information. If there is a conflict between assistance information, then both may be discarded. Alternatively, the one with the lower priority may be discarded Step 5: Using Assistance Information at Requester UE
Assistance Information at MAC Layer To address Problem 3, which involves issues with the coordination of assistance, assistance information may be used at the MAC layer to reduce or modify the candidate resource set. The UE has a candidate resource set $\{Rx,y\}$ for the selection window. The selection window duration is based on the packet delay budget for the sidelink data in the sidelink logical channels. The set $\{Rx,y\}$ includes those time and frequency resources that are at time slot y and subchannel x. The number of subchannels in the time and frequency resources is based on the selected amount of frequency resources.

The set $\{Rx,y\}$ does not include any slot that was eliminated because the UE could not sense the transmission of PSCCH or PSSCH because it was transmitting (either in the sidelink or on the uplink). The candidate resources that were removed from the selection window as a result of this half-duplex issue are denoted $\{Hx,y\}$, and referred to as the half-duplex resource set.

Whitelist Assistance Information

The whitelist may include a set of slots for which an assistant UE tells the requester UE that the sidelink transmission over these slots is allowed or preferred.

The whitelist may include a set of resources (subchannel on a slot) or beams for which an assistant UE tells the requester UE that the sidelink transmission over these resources is allowed or preferred.

Figure 7:
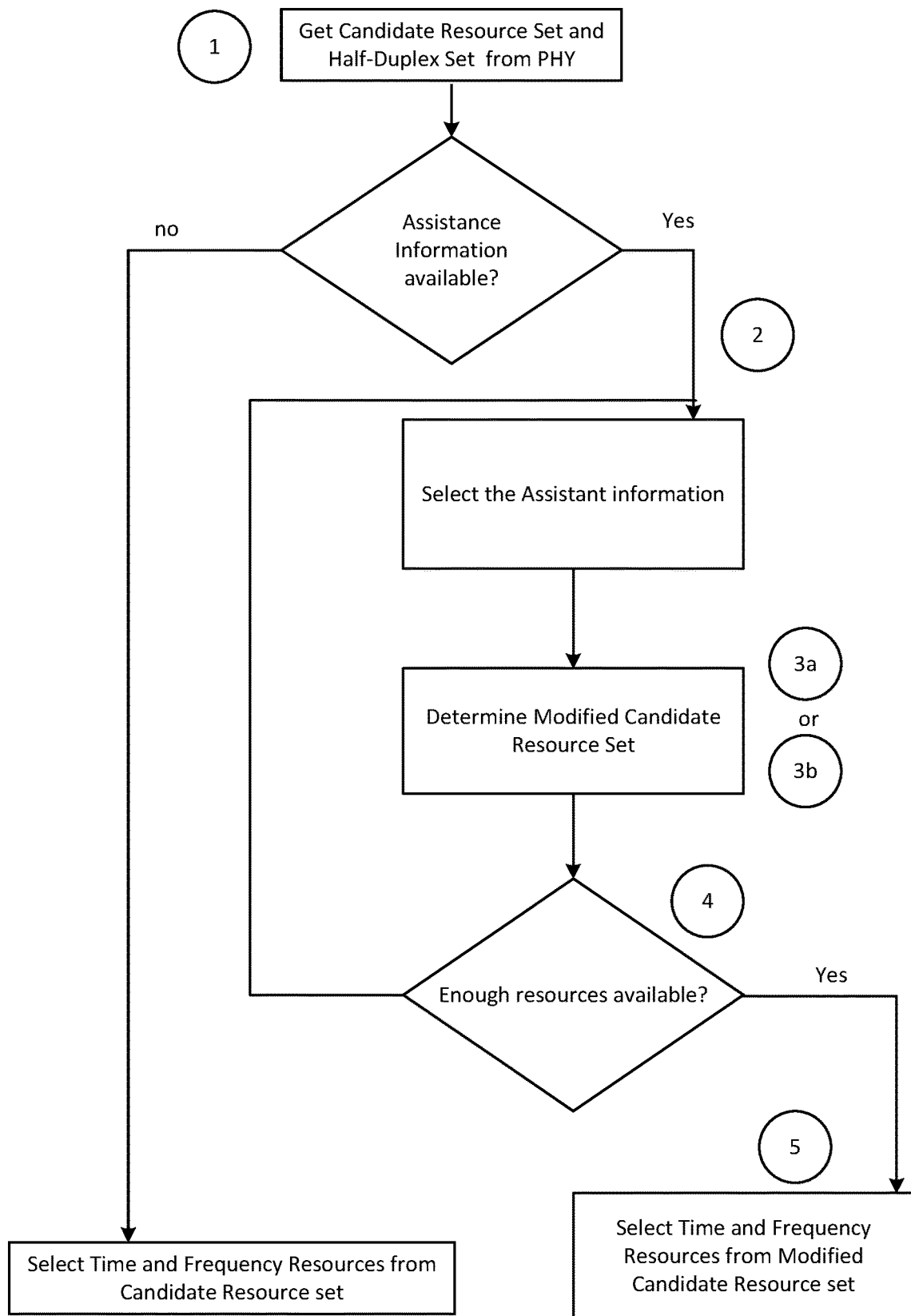
FIG. 7 illustrates an example of managing whitelist assistance.

The following sub-steps are to be performed as part of Step 5 in FIG. 4. The sub-steps are depicted in FIG. 7 and described below.

Step 1: The Sidelink Grant Reception process is provided with the candidate resource set $\{Rx,y\}$ as well as the half-duplex resource set $\{Hx,y\}$.

Step 2: If UE is configured to use assistance information and this information is available, the Sidelink Grant Reception process selects the assistance information to use. This may be based on one or more of the following criteria: the destination that has logical channels with the highest priority, randomly selected, the destination that has the logical channel whose packet delay budget was used to restrict the selection window, the priority of the assistance information, etc.

Figure 8:
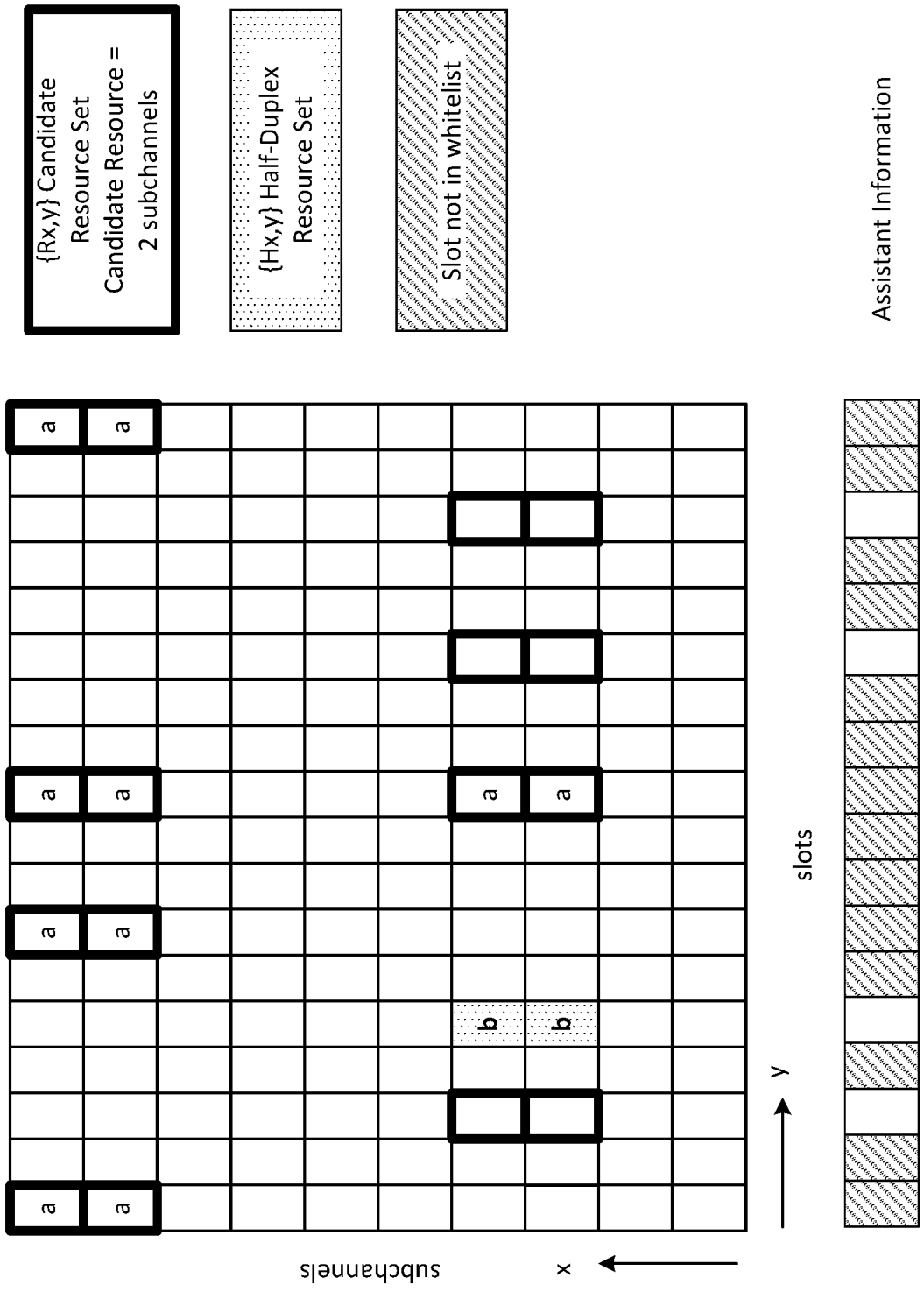
FIG. 8 illustrates an example of down-selection with whitelist assistance.

Step 3a: If the assistance information is a whitelist of slots, the Sidelink Grant Reception process removes from the candidate resource list any candidate resources that are in slots that are not in one of the whitelist slots (Resources labelled 'a' in FIG. 8). The Sidelink Grant Reception process may also include in the candidate resource list any resource in the half-duplex resource set $\{Hx,y\}$ that falls in a whitelist slot, and for which the UE has no intention of using for any transmission (no sidelink configured grant for transmission) (resources labelled 'b' in FIG. 8). The Sidelink Grant Reception process then has a Modified candidate resource set $\{R'x,y\}$.

Step 3b: If the assistance information is a whitelist of resources, the Sidelink Grant Reception process removes from the candidate resource list any candidate resources that are not in whitelist of resources. The Sidelink Grant Reception process may also include in the candidate resource list any resource in the half-duplex resource set $\{Hx,y\}$ that falls in a whitelist of resources, and for which the UE has no intention of using for any transmission (no sidelink configured grant for transmission). The Sidelink Grant Reception process then has a Modified candidate resource set $\{R'x,y\}$.

Step 4: The Sidelink Grant Reception process determines if the number of transmission opportunities in the Modified candidate resource set $\{R'x,y\}$ is enough to satisfy the transmission and optionally the selected number of HARQ retransmissions. If yes, go to Step 5. If no, the Sidelink Grant Reception process may return to Step 2 and select another assistance information to use. Alternatively, the Sidelink Grant Reception process may revert back to the candidate resource set $\{Rx,y\}$.

Step 5: Randomly select the time and frequency resources for one transmission opportunity from the Modified candidate resource set $\{R'x,y\}$.

Step 6: Continue with the Release 16 procedure for Sidelink Grant Reception process.

Blacklist Assistance Information

The blacklist may include a set of slots for which an assistant UE tells the requester UE that the sidelink transmission over these slots should not be allowed.

The blacklist may include a set of resources (subchannel on a slot) for which an assistant UE tells the requester UE that the sidelink transmission over these resources should not be allowed.

The following sub-steps are to be performed as part of Step 5 in FIG. 4. The flowchart is similar to that shown in FIG. 7.

Step 1: The Sidelink Grant Reception process is provided with the candidate resource set {Rx,y} as well as the half-duplex resource set {Hx,y}

Step 2: The Sidelink Grant Reception process selects the assistance information to use. This may be based on one or more of the following criteria: the destination that has logical channels with the highest priority, randomly selected, the destination that has the logical channel whose packet delay budget was used to restrict the selection window, the priority of the assistance information, etc.

Figure 9:
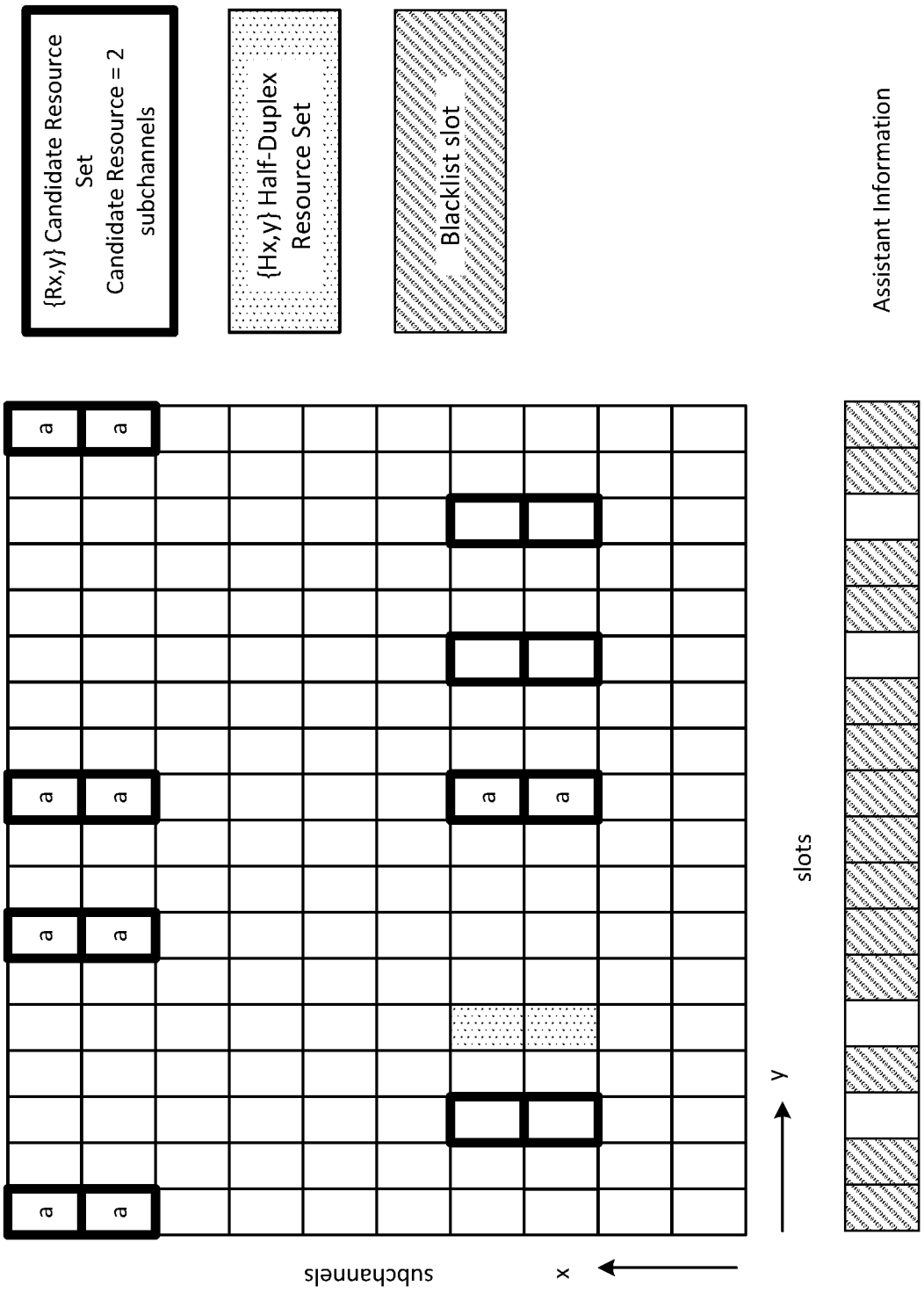
FIG. 9 illustrates an example of down-selection with blacklist assistance.

Step 3a: If the assistance information is a blacklist of slots, the Sidelink Grant Reception process removes from the candidate resource list any candidate resources that are in slots that are in the blacklist slots (Resources labelled 'a' in FIG. 9). The Sidelink Grant Reception process then has a Modified candidate resource set {R'x,y}.

Step 3b: If the assistance information is a blacklist of resources, the Sidelink Grant Reception process removes from the candidate resource list any candidate resources that are in the blacklist of resources. The Sidelink Grant Reception process then has a Modified candidate resource set {R'x,y}.

Step 4: The Sidelink Grant Reception process determines if the number of transmission opportunities in the Modified candidate resource set {R'x,y} is enough to satisfy the transmission and optionally the selected number of HARQ retransmissions. If yes, go to Step 5. If no, the Sidelink Grant Reception process may return to Step 2 and select another assistance information to use. Alternatively, the Sidelink Grant Reception process may revert back to the candidate resource set {Rx,y}.

Step 5: Randomly select the time and frequency resources for one transmission opportunity from the Modified candidate resource set {R'x,y}.

Step 6: Continue with the Release 16 procedure for Sidelink Grant Reception process.

Resource Allocation Assistance Information

Figure 10:
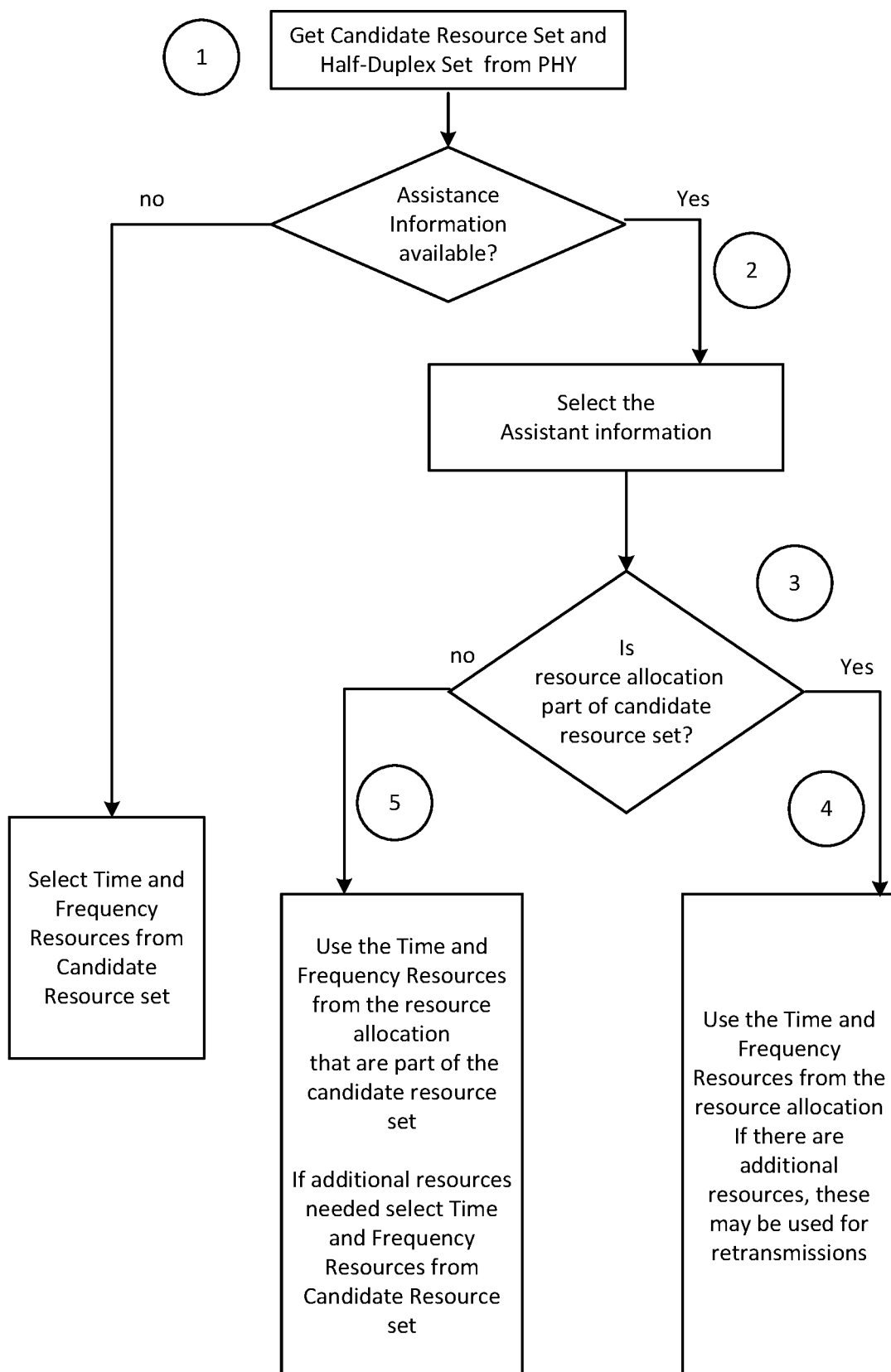
FIG. 10 illustrates an example of managing resource allocation assistance.

The Resource Allocation from the assistant UE, may include one or more resources that the requester UE may use for transmission. The set may be used for a transmission and any potential retransmissions The following sub-steps are to be performed as part of Step 5 in FIG. 4. The sub-steps are depicted in FIG. 10 and described below.

Step 1: The Sidelink Grant Reception process is provided with the candidate resource set {Rx,y} as well as the half-duplex resource set {Hx,y}.

Step 2: The Sidelink Grant Reception process selects the assistance information to use. This may be based on one or more of the following criteria: the destination that has logical channels with the highest priority, randomly selected, the destination that has the logical channel whose packet delay budget was used to restrict the selection window, the priority of the assistance information, etc.

Step 3a: If the assistance information is a Resource allocation, the Sidelink Grant Reception process may check if the resources in the resource allocation are part of the candidate resource set. If yes, go to Step 4. If no go to Step 5.

Step 4: Use the time and frequency resources from the resource allocation for the initial transmission. If there are additional resources in the resource allocation, use these additional resources for the selected number of HARQ retransmissions. If there are not enough additional resources in the resource allocation, randomly select the time and frequency resources for the additional transmission opportunities from the candidate resource set {Rx,y}. Continue at Step 6.

Step 5: One or more of the resources in the resource allocation may not be part of the candidate resource set. Four options are available.

First is to ignore the resource allocation, and randomly select the time and frequency resources for the transmission opportunities (initial transmission and retransmissions) from the candidate resource set {Rx,y}.

Second is to use the resources in the resource allocation that are part of the candidate resource set and ignore those resources in the resource allocation that are not part of the candidate resource set. For the transmission opportunities that have no resources in the resource allocation, the Sidelink Grant Reception process may rely on random selection of the time and frequency resources from the candidate resource set. Note that this is the option shown in FIG. 10.

Third is to ignore the candidate resource set and rely on the resources from the resource allocation.

Fourth is to return to Step 2 and select another assistance information to use.

Step 6 is to continue with the Release 16 procedure for Sidelink Grant Reception process.

Candidate Resource Set Assistance Information

The assistant UE may be a special UE that has sensing capability and has no issue with power consumption. For example, this may be a roadside unit (RSU) that provides the candidate resource set to UEs in proximity. These UEs in proximity do not need to do their own sensing and thus may conserve power.

The candidate resource set assistance information may be in the form of a set {Ux,y} provided over subchannels (x) and over multiple slots (y) of a selection window. The set includes all subchannels within the selection window for which a sidelink transmission is expected. Alternatively, the set may include all subchannels within the selection window for which a sidelink transmission is not expected.

The following sub-steps are to be performed in replacement of Step 5 in FIG. 4. It is assumed that {Ux,y} includes all subchannels within the selection window for which a sidelink transmission is expected.

Step 1: The Sidelink Grant Reception process uses the assistance information to determine all subchannels in the selection window that are not to be used for sidelink transmission {Ux,y}. The remaining subchannels in the resource window are part of the candidate resource set.

Step 2: The Sidelink Grant Reception then goes over this candidate resource set to determine the set of contiguous subchannels that can accommodate the amount of selected frequency resources (subchannels) for this sidelink process. This amount is selected in a prior step as part of the R16 Sidelink Grant Reception process. This set of contiguous subchannels becomes the candidate resource set.

Step 3: Randomly select the time and frequency resources for one transmission opportunity from the candidate resource set.

Step 4: Continue with the Release 16 procedure for Sidelink Grant Reception process.

Note that the candidate resource set assistance information may also be used together with the other assistance information (blacklist, whitelist, resource allocation). In such a case, the candidate resource set is not determined from interaction with the PHY layer, as described in Step 5 of FIG. 4. Rather, the candidate resource set is determined from the steps described above.

Also note that the candidate resource set assistance information may also be used by UEs that are using their own sensing to determine the candidate resource set. In such cases, the UE would have two candidate resource sets—Set 1 provided by the assistant UE and Set 2 measured locally by the requester UE. In cases of a mismatch between these two sets, the Sidelink Grant Reception process must determine how to deal with the resources that have a mismatch. The five options are possible. First is not to consider the resource as a valid resource for a transmission opportunity. Second is to consider the resource as a valid resource for a transmission opportunity. Third is to always follow the rules for Set 1. Fourth is to always follow the rules for Set 2. Fifth is to use the rules for Set 2 if the assistance information is received less than K slots ago.

Assistance Information at PHY Layer

For assistance information at the PHY layer, the assistance information is used at the PHY layer. As part of Step 5 in FIG. 4, the MAC layer retrieves the candidate resource list from the PHY layer. The MAC layer provides the number of subchannels required for the grant it is trying to determine, as well as the packet delay budget of the available sidelink data. In addition, we propose that the MAC also provide the assistance information to the PHY layer (for example the blacklist, whitelist, resource allocation, or measurements). The PHY layer may use this information to reduce sensing. For example, if the PHY layer knows that certain slots have been blacklisted by the assistant UE, the PHY layer may avoid sensing on these slots. Similarly, if the PHY layer knows that certain slots/subchannels are preferred by the assistant UE, the PHY layer may target sensing to these slots/subchannels. Similarly, if the PHY layer knows the resource allocation provided by the assistant UE, the PHY layer may only perform sensing for these targeted resources.

Addressing Problem 1—Lack of Coordination Between Resource Selection and MAC PDU Assembly at Requester UE.

Problem 1 arises for two reasons. First, a UE may have sidelink traffic in its logical channels that is targeting one or more different destinations (identified by a Layer 2 ID). This is unlike the Uu link, where all uplink traffic is targeting the serving cell. As a result, the sidelink resource allocation process has an extra step of selecting the destination. The MAC PDU is then built for this single destination, by selecting data from the logical channels that have traffic to this destination.

Second, resource allocation for Release 16 sidelink allows a UE to determine the grant to use for a sidelink transmission and then to build the MAC PDU to be transmitted on this grant based on the priority of the data in the logical channels. Irrespective of the destination of the traffic.

Figure 11A:
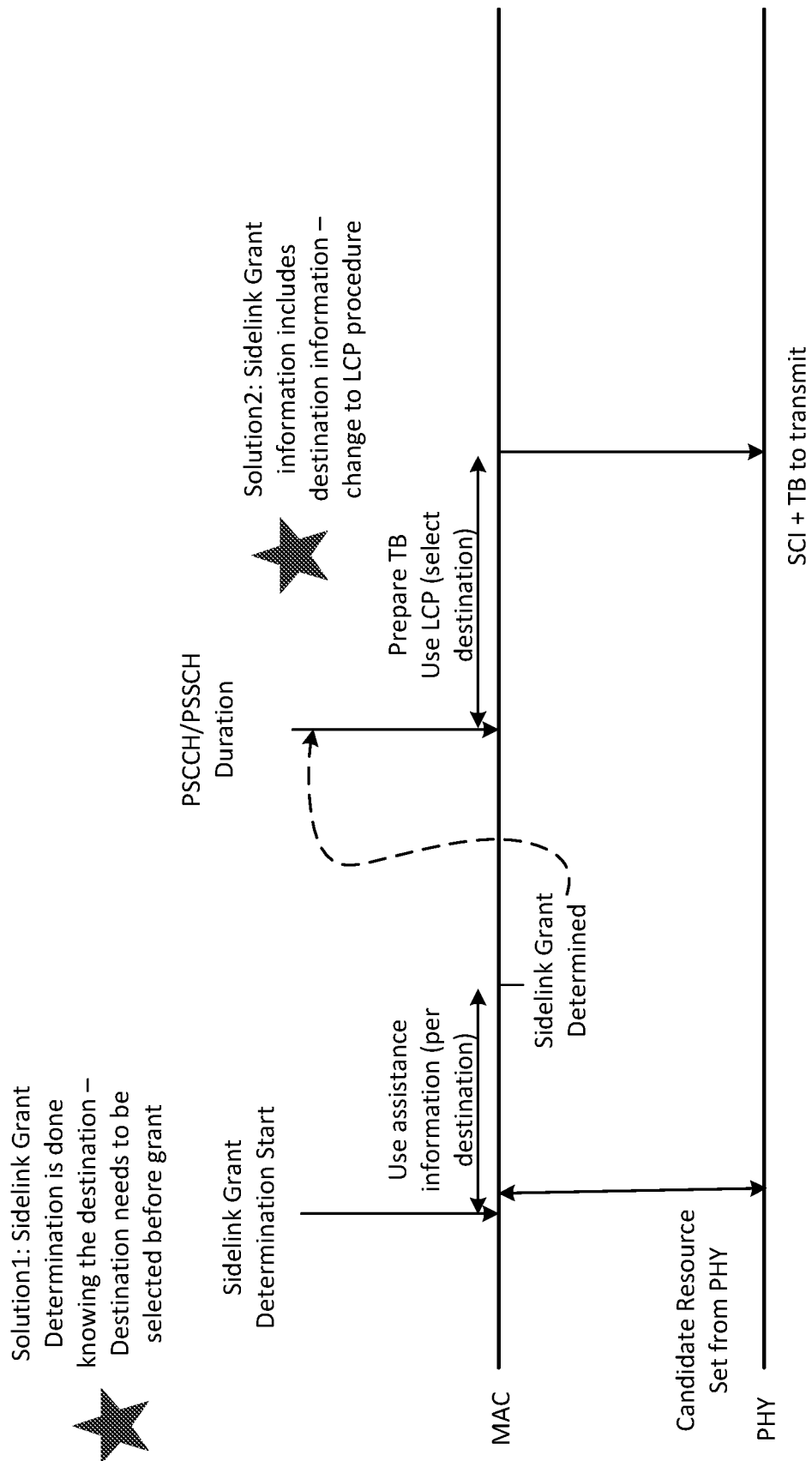
FIG. 11A illustrates an example of coordination in resource selection and MAC PDU assembly.

A problem arises when the grant is determined based in assistance information to a specific destination. This grant is then intended for this particular destination, but the MAC PDU that is built is not necessarily targeting this destination (as it was selected based on logical channel priority). This problem is depicted in FIG. 11.

Two solutions are proposed to solve this problem. Solution 1 relies on determining the grant based on the destination of the MAC PDU that will fill this grant. Solution 2 relies on a more reactive approach, where the grant information includes the destination for which the grant is allocated. The UE would then use this information when it builds the MAC PDU.

Solution 1: Determine Grant for the Selected Destination

In a first solution, during the Sidelink Grant Reception process, the Sidelink Grant Reception may determine the destination of the logical channel with the highest priority. The UE may then evaluate if the assistance information is for a specific destination. If so, the sidelink grant will be determined for this destination. The destination information may be included as part of the grant information that is passed to the HARQ entity. If the assistance information is not for a specific destination, then sidelink grant will be determined independently of the destination (as in the R16 Sidelink Grant Reception process). In such a case, the Sidelink Grant Reception process needs to indicate that the grant is not tied to a specific destination. The destination may be omitted from the determined grant, or the destination may be set to a special reserved address (for example FFF, or a broadcast address.) Alternatively, the grant may carry a special indication flag.

When the MAC PDU is built, the Multiplex and Assembly entity will use this indication to perform destination selection for this sidelink grant—prior to MAC PDU assembly.

Note that the notion of tying a grant to a specific destination may be extended to sidelink dynamic grants and sidelink configured grants Type 1 and Type 2. In such a case, the gNB may provide a target destination in the DCI grant signaling. The Sidelink Grant Reception process may then tie the dynamic grant, configured grant type 1, or configured grant type 2 to the provided destination, and include this destination as part of the grant information that is passed to the HARQ entity. If the gNB does not provide a target destination in the DCI grant signaling, the Sidelink Grant Reception process could then use one of the mechanisms already described, to indicate that the grant information is not tied to a destination. When the MAC PDU is built, the Multiplex and Assembly entity will use this indication to perform destination selection for this sidelink grant—prior to MAC PDU assembly.

The procedure for determining the sidelink grant (Sidelink Grant Reception), and MAC PDU assembly (Multiplexing and Assembly) are shown in Appendix 1 of this disclosure. The new functionality is shown underlined, while removed legacy functionality is shown with a strikethrough.

Solution 2: Build PDU for the Destination Linked to the Grant

The second solution is to build a PDU for the destination linked to the grant. In this solution, the destination is not selected prior to determining the sidelink grant. However, if the Sidelink Grant Reception uses assistance information that is destination specific in determining the sidelink grant, it will link this destination to the configured sidelink grant. At the time of MAC PDU assembly, the UE may use this linked destination to build the MAC PDU. However, this suffers from the drawback that the MAC PDU may not contain sidelink data from the logical channels with the highest priority. As an alternative, the Multiplex and Assembly may build a MAC PDU as in the legacy R16 procedure. It would select a destination based on priority and then the logical channels from which the MAC PDU will be built. If the destination selected by the Multiplex and Assembly process matches the destination of the sidelink grant, the MAC PDU may be built as in the legacy R16 system. If the destination selected by the Multiplex and Assembly process does not match the destination of the sidelink grant, the UE may ignore selected destination and use the destination linked to the grant. In this case, the Multiplex and Assembly process may trigger the Sidelink Grant Reception process to use the assistance information for the selected Destination. As a result, for the subsequent grant determination, the sidelink grant is determined based on assistance information targeting the destination that has the logical channels with the highest priority.

Alternatively, the UE may use the selected destination, build the MAC PDU for the selected destination, but use a reduced MCS for the PDU. This is to compensate for the fact that the sidelink grant was determined based on assistance information to a different destination.

The procedure for determining the sidelink grant (Sidelink Grant Reception), and MAC PDU assembly (Multiplexing and Assembly) are shown in Appendix 2 of this disclosure. The new functionality is shown underlined, while removed legacy functionality is shown with a strikethrough.

Resource Sensing and Selection with Assistance Information

Figure 11B:
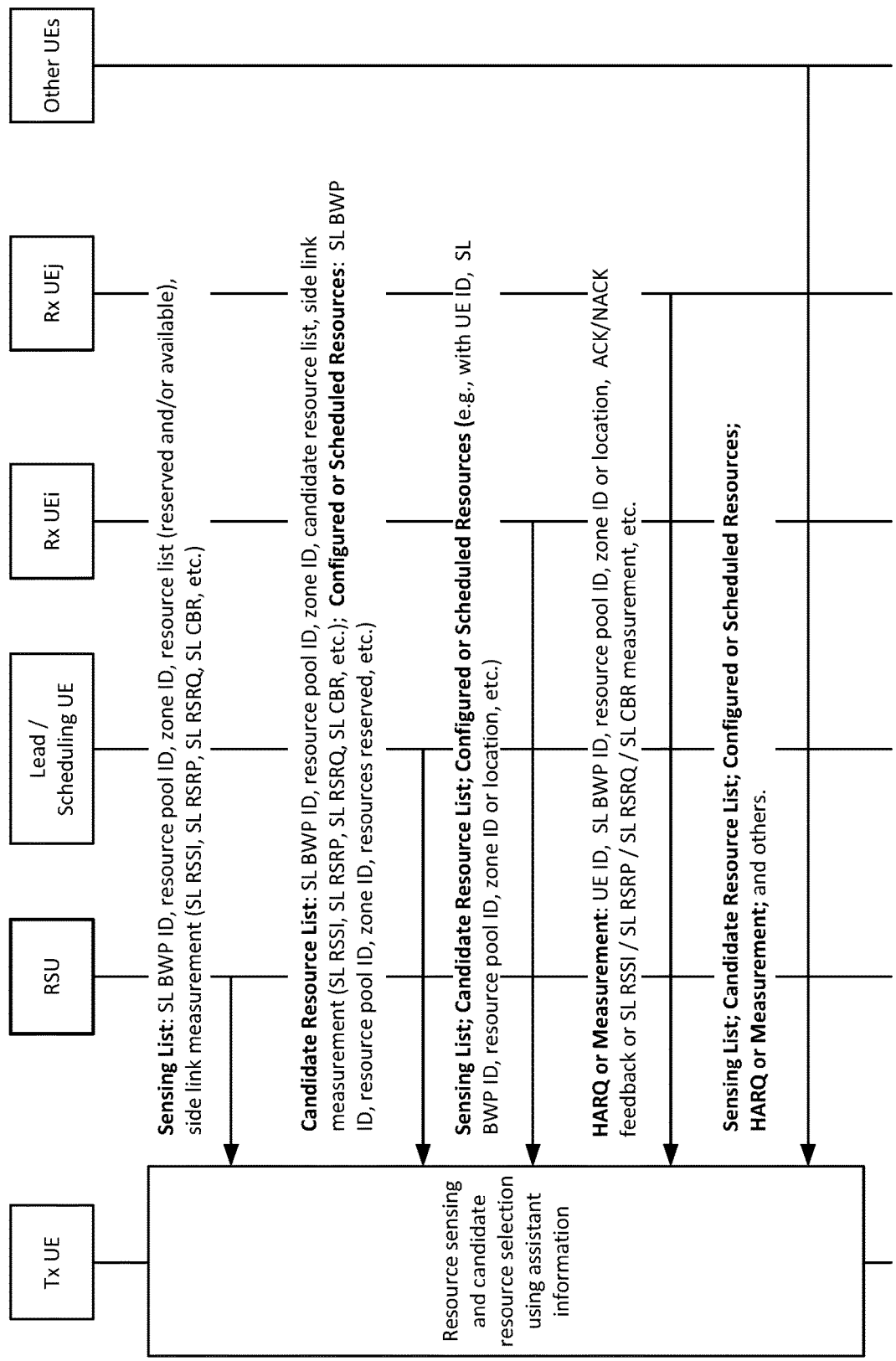
FIG. 11B illustrates an example of resource sensing and selection with assistance information.

As shown in the example of FIG. 11B, a transmitting UE may receive different kinds of assistance information, such as Sensing List, candidate resource list, Scheduling with Reserved Resources, HARQ feedback, measurement report of RSRP, CSI, and/or CBR, etc., from an RSU, a Lead of a group or a Lead of the proximity, a scheduling UE, a receiving UE (e.g., Rx UE i and Rx UEj) and other UEs in the proximity, where the proximity is a communication range based on different services or QoS requirements that UEs may communicate with each other on the sidelink.

The Sensing List may contain five items of information. First, is sidelink bandwidth part (SL BWP) ID(s). Second is resource pool ID(s). Third is zone ID(s).

Fourth is resource list(s) reserved and/or available in time, e.g., slots, in frequency, e.g., PRBs or subchannels, and in space, e.g., beam index or ID/Transmit and Receive Point (TRP) index or ID/sidelink reference signal resource pool index, sidelink Demodulation Reference Signal (SL DMRS) port, sidelink QCL Quasi-CoLocation (SL QCL) or sidelink Transmission Configuration Indication (SL TCI), etc.; and Fifth is associated sidelink measurement(s) such as sidelink RSSI (SL Received Signal Strength Indicator)/sidelink RSRP (SL Reference Signal Received Power)/sidelink RSRQ (SL Reference Signal Received Quality)/sidelink CSI (SL Channel State Information)/sidelink CBR (SL Channel Busy Ratio) measurement, etc.

The candidate resource list may contain the following items of information: sidelink bandwidth part ID(s); resource pool ID(s); zone ID(s); candidate resource list(s) in time, e.g., slots, in frequency, e.g., PRBs or subchannels, and in space, e.g., beam index or ID/TRP index or ID/sidelink reference signal resource pool index, SL DMRS port, SL QCL or SL TCI, etc.; and associated sidelink measurements, such as SL RSSI, SL RSRP, SL RSRQ, SL CSI, SL CBR, etc.

The Configured or Scheduled Resources may contain the following items of information: sidelink bandwidth part ID(s); resource pool ID(s); zone ID(s); and resources in time, e.g., slots, in frequency, e.g., PRBs or subchannels, and in space, e.g., beam index or ID/TRP index or ID/sidelink reference signal resource pool index, SL DMRS port, SL QCL or SL TCI, etc.

The HARQ or Measurement may contain the following items of information: sidelink bandwidth part ID(s); resource pool ID(s); zone ID(s) or location(s); sidelink ACK/NACK feedback; and sidelink measurements, such as SL RSSI, SL RSRP, SL RSRQ, SL CSI, SL CBR, etc.

The assistance information may be transmitted on sidelink (e.g., PC5 interface) via at least one of the following four messaging or signaling mechanisms.

First is sidelink system information carried on NR PSBCH (New Radio Physical Sidelink Broadcast Channel), e.g., sidelink Main Information Block (SL MIB), for example, used for Sensing List; or carried on NR PSSCH (New Radio Physical Sidelink Shared Channel), e.g., sidelink System Information Block (SL SIB) broadcasted via the common search space, or groupcasted via group search space, or unicasted via a UE search space, which may be periodically or aperiodically per UE's request or demand, for example, used for Sensing List.

Second is Sidelink RRC message carried on NR PSSCH, which may be broadcasted via the common search space, or groupcasted via group search space, or unicasted via a UE search space. The casting may be periodically or aperiodically or per a UE's request or demand, for example, used for Sensing List, candidate resource list, Configured Resources, measurement of SL RSSI, SL RSRP, SL RSRQ, SL CSI, or SL CBR, etc.

Third is Sidelink MAC CE carried on NR PSSCH, which may be broadcasted via the common search space, or groupcasted via group search space, or unicasted via a UE search space. The casting may be periodically or aperiodically or per a UE's request or demand, for example, used for activating/deactivating Sensing List, activating/deactivating semi-persistent candidate resource list, activating/deactivating semi-persistent Scheduled Resources, measurement of SL RSSI, SL RSRP, SL RSRQ, SL CSI, or SL CBR, etc.

Fourth is Sidelink Physical layer (PHY) signaling carried on NR PSCCH (New Radio Physical Sidelink Control Channel) and/or PSSCH, which may be broadcasted via the common search space, or groupcasted via group search space, or unicasted via a UE search space. The casting may be periodically or aperiodically (e.g., triggered by the UE) or per a UE's request or demand, for example, used for one or more of the following purposes.

First is sensing list updates of a SL BWP ID, a resource pool ID or a zone ID, e.g., a bit map with slots indicating the resources available in time corresponding to the associated subchannels and space (e.g., beam index or ID/TRP index or ID/sidelink reference signal resource pool index, SL DMRS port, SL QCL or SL TCI, etc.) under sensing; or an index point of a resource sensing table with time and frequency and space (e.g., beam index or ID/TRP index or ID/sidelink reference signal resource pool index, SL DMRS port, SL QCL or SL TCI, etc.).

Second is candidate resource list updates of a SL BWP ID, a resource pool ID or a zone ID, for example, a bit map with slots indicating the candidate resources in time corresponding to the associated subchannels and space (e.g., beam index or ID/TRP index or ID/sidelink reference signal resource pool index, SL DMRS port, SL QCL or SL TCI, etc.); or an index point of a candidate resource table with time and frequency and space (e.g., beam index or ID/TRP index or ID/sidelink reference signal resource pool index, SL DMRS port, SL QCL or SL TCI, etc.).

Third is dynamically Scheduled Resources of a SL BWP ID, a resource pool ID or a zone ID indicated by NR PSCCH in the common search space or group search space or UE search space, for example, a bit map with slots indicating the resources scheduled in time corresponding to the associated subchannels and space (e.g., beam index or ID/TRP index or ID/sidelink reference signal resource pool index, SL DMRS port, SL QCL or SL TCI, etc.); or an index point of a resource table (e.g., with start and length in time) with time and frequency and space (e.g., beam index or ID/TRP index or ID/sidelink reference signal resource pool index, SL DMRS port, SL QCL or SL TCI, etc.).

Fourth is SL RSSI, SL RSRP, SL RSRQ, SL CSI, or SL CBR measurement carried on NR PSSCH or NR PSFCH (Physical Sidelink Feedback Channel).

For resource sensing and selection for PSSCH/PSCCH transmission, the higher layer may provide the following seven parameters to physical layer (e.g., PHY). First are the sidelink BWP(s), second are the resource pool(s), and third is the assistance information configuration per resource pool of a sidelink BWP. Fourth is the L1 priority, $prio_{TX}$, per resource pool of a sidelink BWP, and fifth is the remaining packet delay budget, per resource pool of a sidelink BWP.

Sixth is the number of sub-channels to be used for the PSSCH/PSCCH transmission in a slot, $L_{subCH}$, per resource pool of a sidelink BWP, and seventh, is the resource reservation interval, $P_{rsvp\_TX}$, in units of mS, per resource pool of a sidelink BWP.

The resource reservation interval is optional, for example.

The resource reservation interval, $P_{rsvp\_TX}$, if provided, is converted from units of ms to units of logical slots, resulting in $P'_{rsvp\_TX}$. The notation ($t_0^{SL}$, $t_1^{SL}$, $t_2^{SL}$, . . . ) denotes the set of slots which can belong to a sidelink resource pool of a sidelink BWP.

The following steps are used for resource sensing and selection with assistance information:

In the first step, a candidate single-slot resource for transmission $R_{x,y}$ with a resource pool of a SL BWP is initially defined per higher layer configuration, which may be initiated with the assistance information, such as Sensing List and/or candidate resource list.

In the second step, the sensing window is defined per the higher layer configuration. A transmit UE may perform the following steps with assistance information in these slots.

In the third step, the internal threshold parameter $Th(p_i)$ is set from the higher layer.

In the fourth step, the set $S_A$ is initialized to the set of all the candidate single-slot resources for a resource pool of a SL BWP.

In the fifth step, the UE shall exclude any candidate single-slot resource $R_{x,y}$ from the set $S_A$ if it meets, in addition to the existing Release 16 exclusion conditions, the following condition: for any periodicity indicated in the assistance information, such as reserved or configured resources, or such resources with the SL measurement above a configured threshold $Th(Assit_i)$ or number of NACK Th(NACK) or number of missed HARQ feedback Th(MissHARQ).

In the sixth step, the UE shall exclude any candidate single-slot resource $R_{x,\ y}$ from the set $S_A$ if it meets, in addition to the existing Release 16 exclusion conditions, the following condition: for any assistance information dynamically indicated with SCI, such as reserved or configured resources, or such resources with the SL measurement above a configured threshold $Th(Assit_i)$, or number of NACK Th(NACK) or number of missed HARQ feedback Th(MissHARQ).

In the seventh step, if the number of candidate single-slot resources remaining in the set $S_A$ is smaller than $0.2\ M_{total}$, then $Th(p_i)$ is increased by 3 dB for each priority value $Th(p_i)$ and the procedure continues with step 4.

The UE shall report set $S_A$ for a resource pool of a SL BWP to higher layers.

Example Environments

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V21), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile Internet, and virtual reality to name a few. All of these use cases and others are contemplated herein.

Figure 12A:
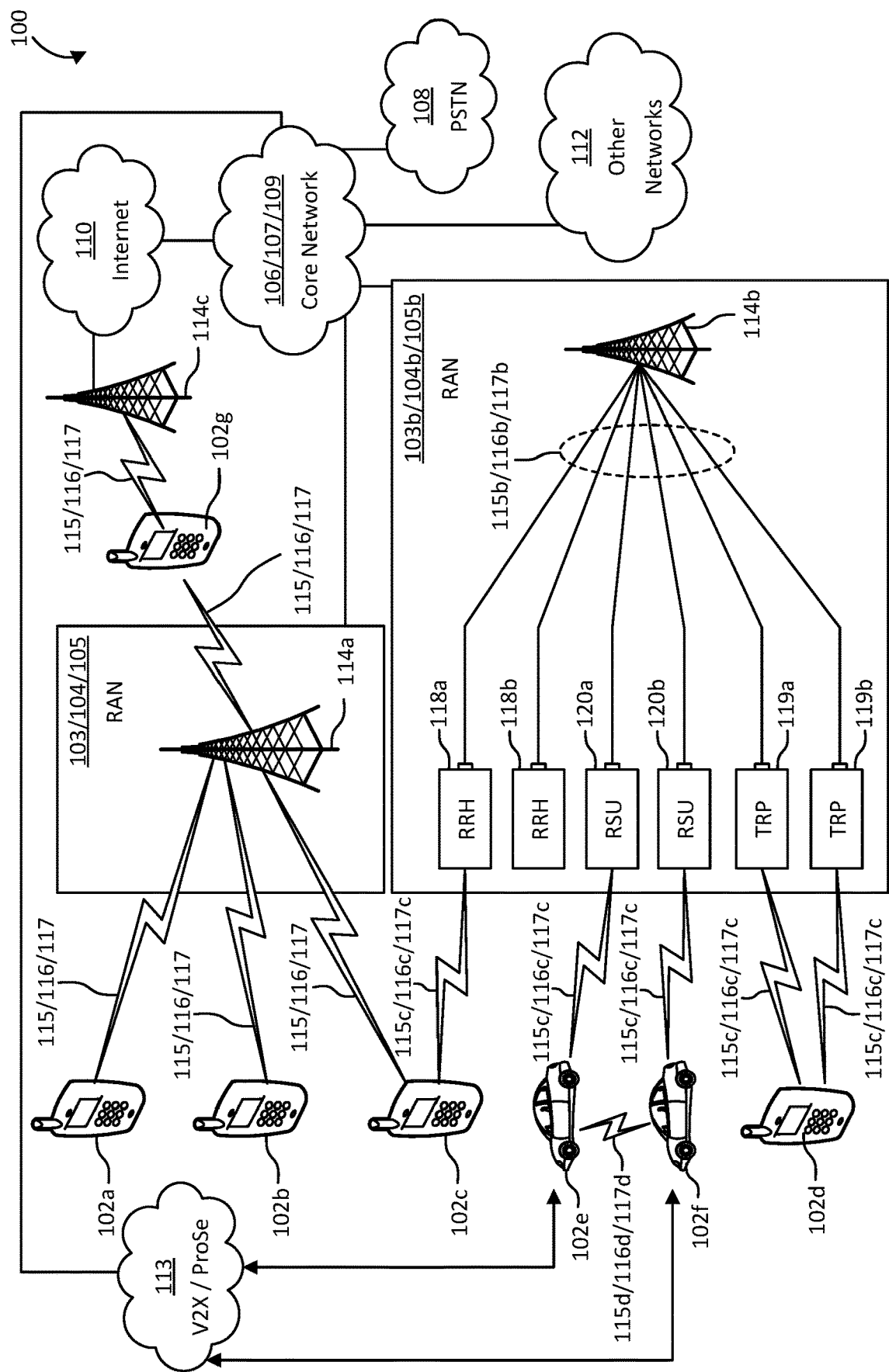
FIG. 12A illustrates an example communications system in which the methods and apparatuses described and claimed herein may be embodied.

FIG. 12A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 12A-12E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b, in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications, etc.). The 3GPP NR technology includes NR V2X technologies and interface (such as Sidelink communications, etc.).

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 12A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 12A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over Internet Protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 12A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet Protocol (IP) in the TCP/IP Internet Protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 12A may be configured to communicate with the base station 114a, which may employ a cellular-based radio technology, and with the base station 114c, which may employ an IEEE 802 radio technology.

Figure 12B:
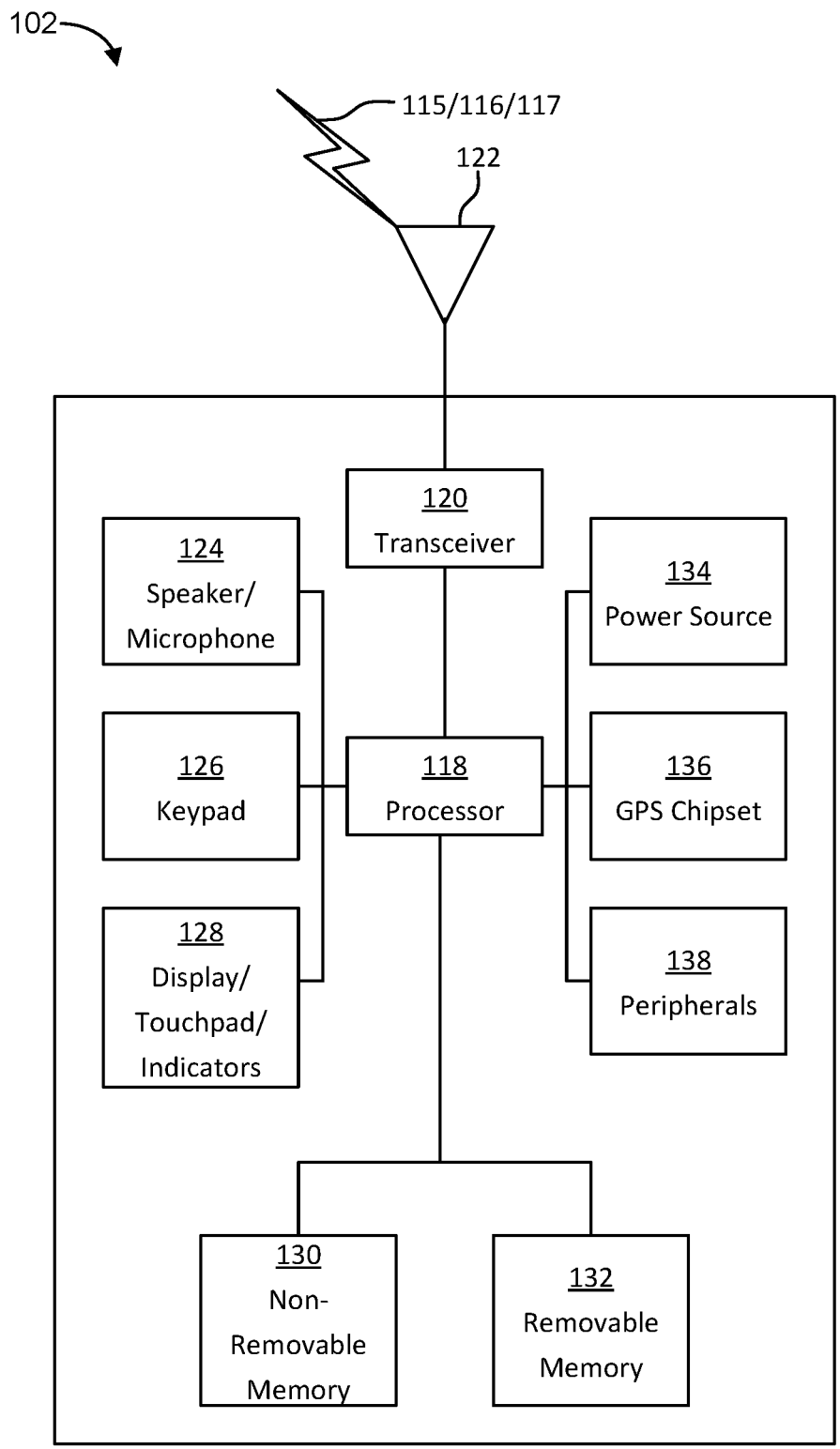
FIG. 12B is a block diagram of an example apparatus or device configured for wireless communications.

FIG. 12B is a block diagram of an example apparatus or device configured for wireless communications in accordance with the embodiments illustrated herein, such as for example, a WTRU 102. As shown in FIG. 12B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 12B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 12B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 12B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 12C:
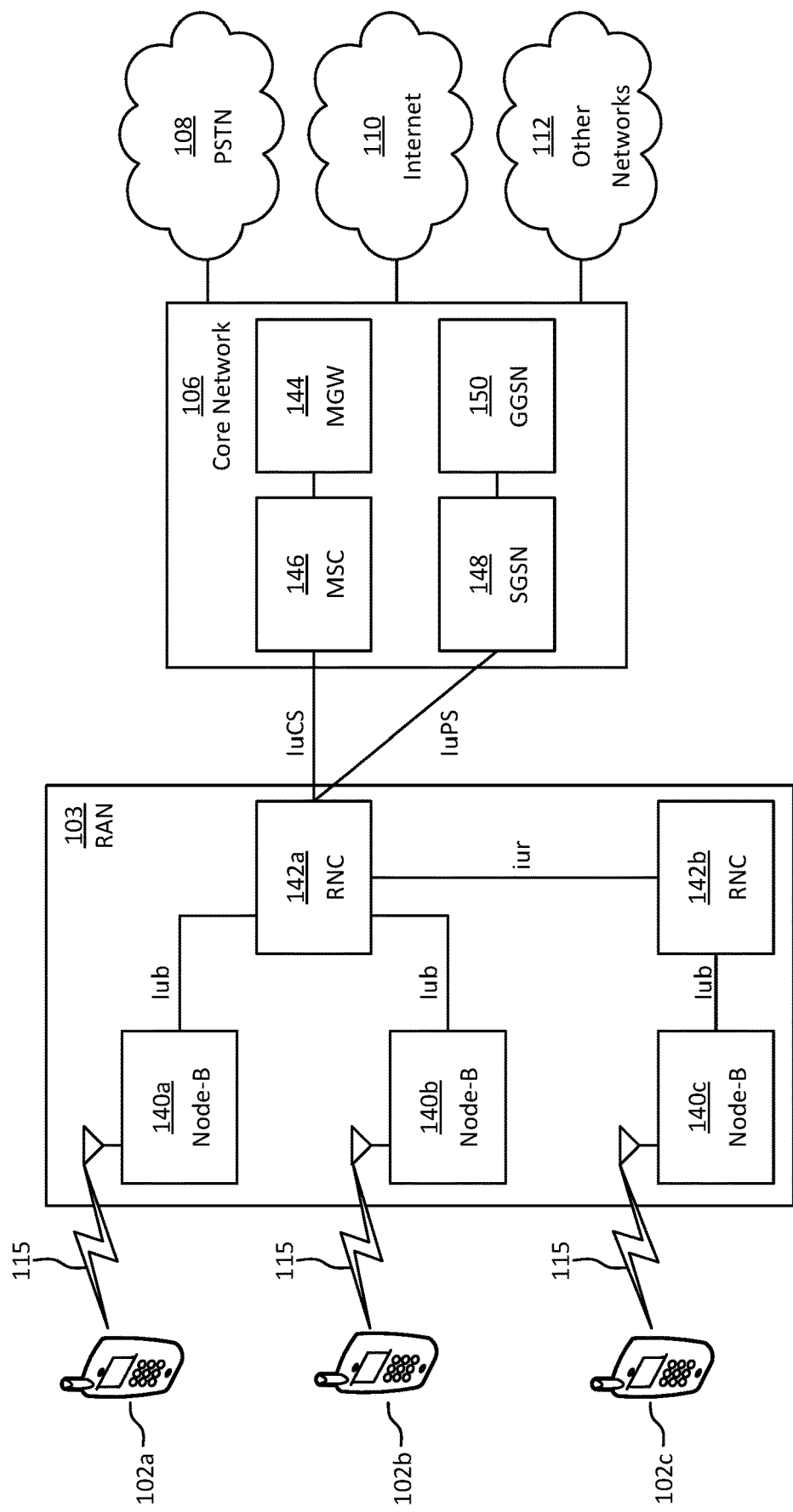
FIG. 12C is a system diagram of an example radio access network (RAN) and core network.

FIG. 12C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 12C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 12C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 12C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 12D:
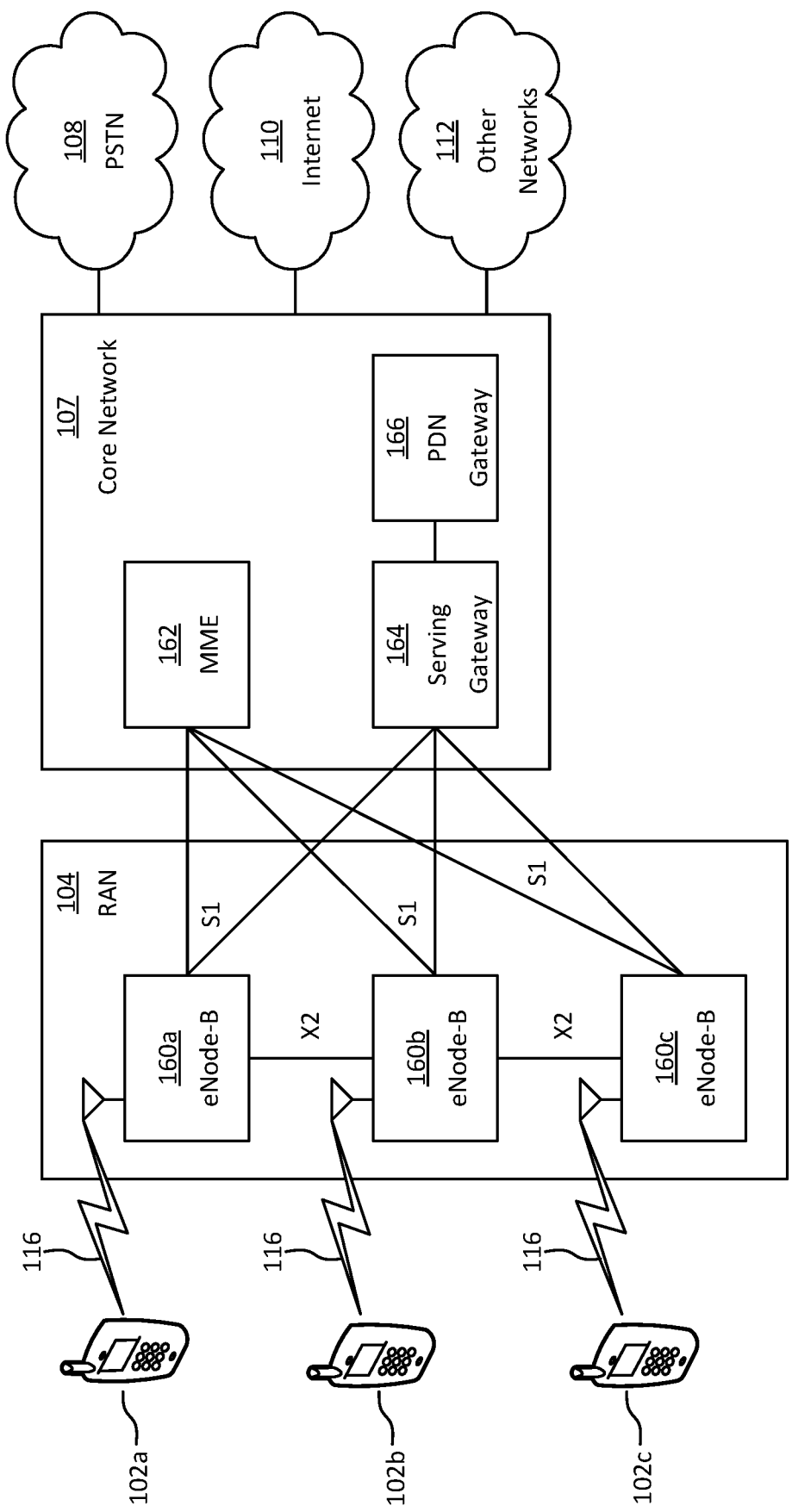
FIG. 12D is a system diagram of another example RAN and core network.

FIG. 12D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 12D, the eNode-Bs 160a, 160b, 160c may communicate with one another over an X2 interface.

The core network 107 shown in FIG. 12D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 12E:
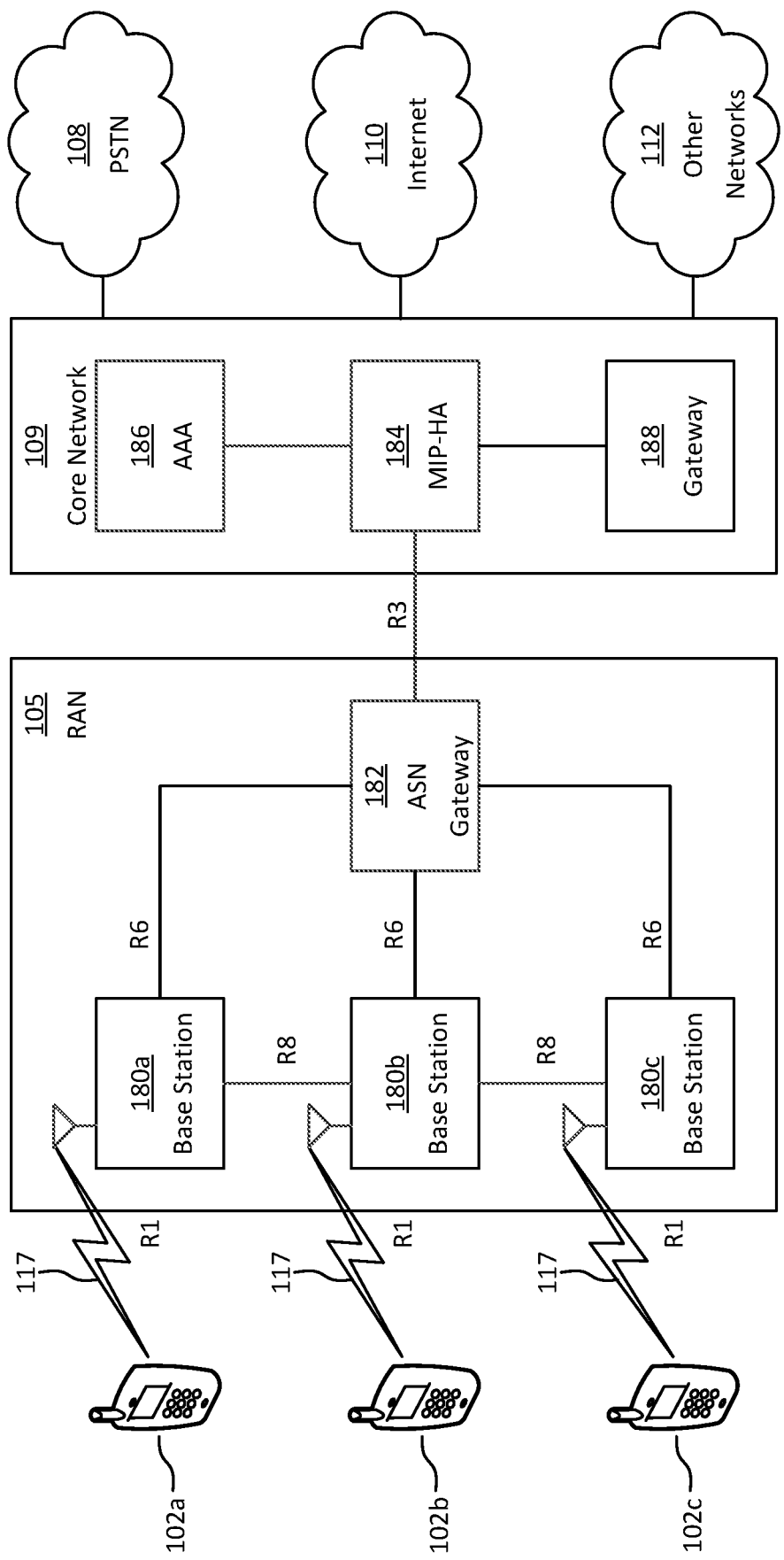
FIG. 12E is a system diagram of another example RAN and core network.

FIG. 12E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 12E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 12E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 12E, it will be appreciated that the RAN 105 may be connected to other ASNs and the core network 109 may be connected to other core networks. The communication link between the RAN 105 and the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 12A, 12C, 12D, and 12E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 12A-12E are provided by way of example only, and it is understood that the subject matter disclosed and claimed herein may be embodied or implemented in any similar communication system, whether presently defined or defined in the future.

Figure 12F:
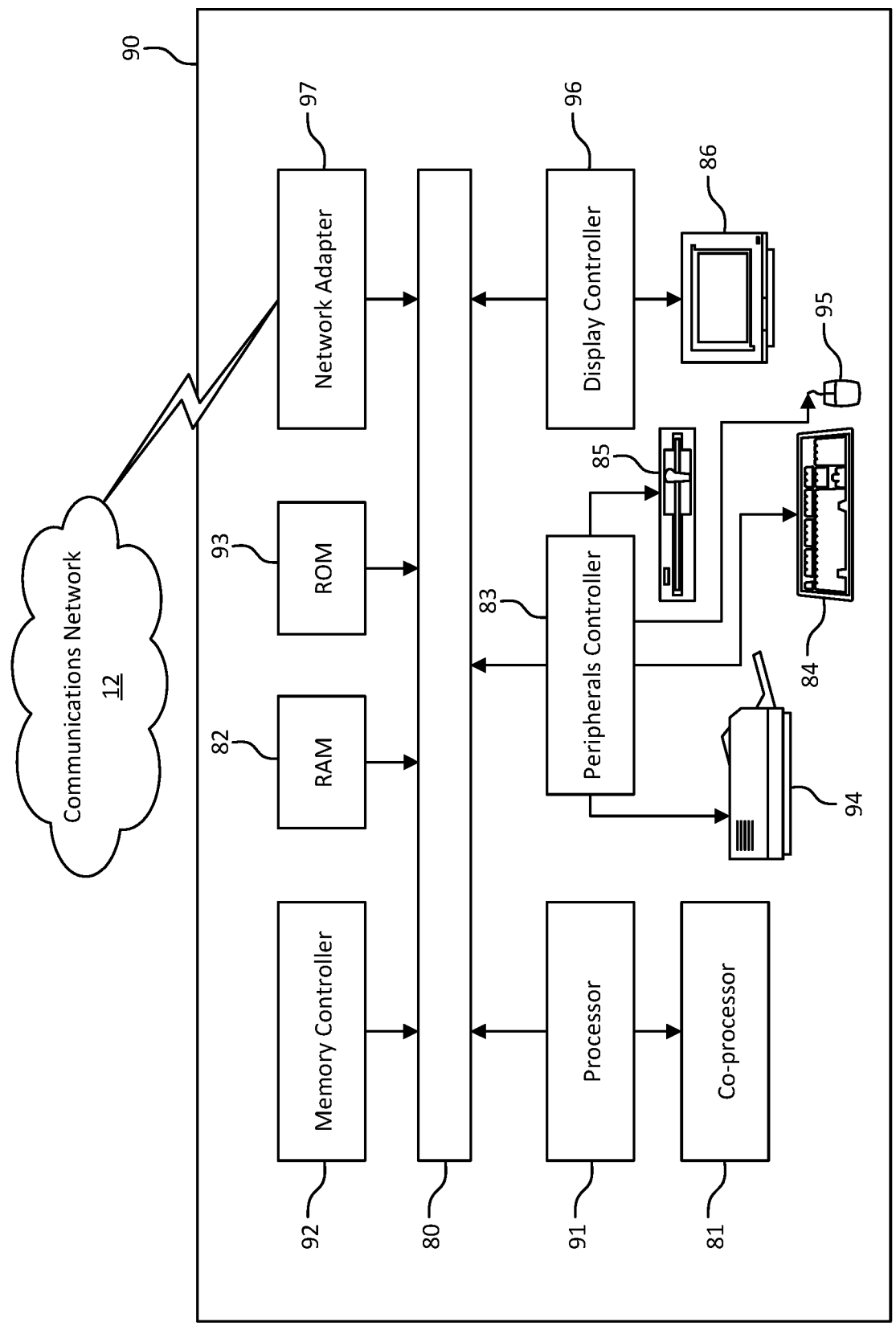
FIG. 12F is a block diagram of an example computing system.

FIG. 12F is a block diagram of an exemplary computing system 90 in which one or more apparatuses of the communications networks illustrated in FIGS. 12A, 12C, 12D, and 12E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space. It cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 12A-12E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 12G:
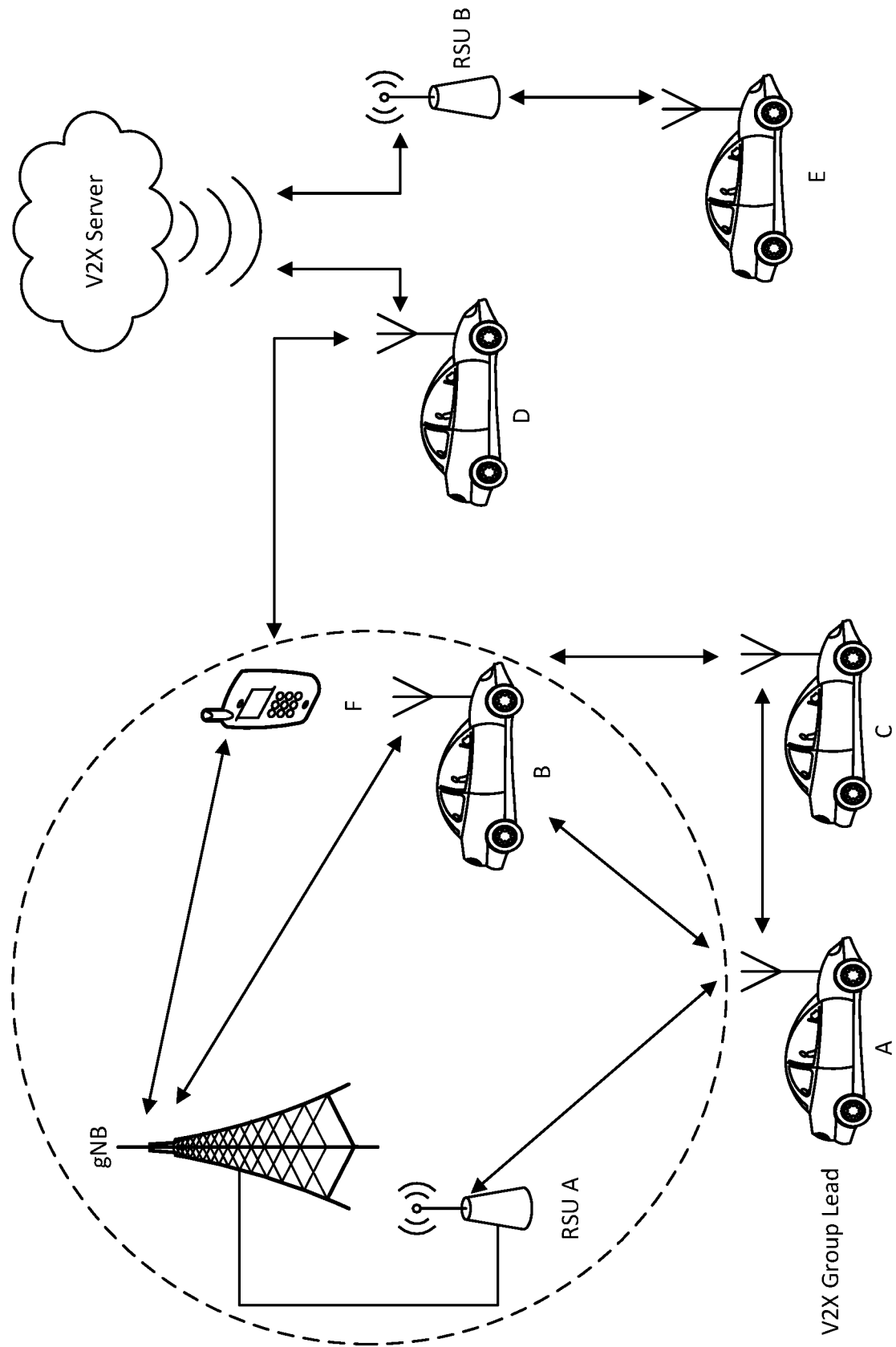
FIG. 12G is a block diagram of another example communications system.

FIG. 12G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

APPENDIX 1

Modified Section 5.x.1.1 SL Grant Reception and SCI Transmission

Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs.

If the MAC entity has been configured by RRC to transmit using a SL-RNTI or SLCS-RNTI as indicated in 3GPP TS 38.331, NR: Radio Resource Control (RRC) protocol specification, V15.8.0 or TS 36.331, the MAC entity shall for each PDCCH occasion and for each grant received for this PDCCH occasion:
1> if a sidelink grant has been received on the PDCCH for the MAC entity's SL-RNTI:
  2> if the NDI received on the PDCCH has been not toggled compared to the value in the previously received HARQ information for the HARQ Process ID:
    3> use the received sidelink grant to determine PSCCH duration(s) and PSSCH duration(s) for one or more retransmissions of a single MAC PDU for the corresponding Sidelink process according to clause 8.1.2 of TS 38.214;
  2> else:
    3> use the received sidelink grant to determine PSCCH duration(s) and PSSCH duration(s) for initial transmission and, if available, retransmission(s) of a single MAC PDU according to clause 8.1.2 of TS 38.214;
  2> consider the received sidelink grant to be a configured sidelink grant; If the received sidelink grant had a target destination, link this destination to the configured sidelink grant.
  2> if a configured sidelink grant is available for retransmission(s) of a MAC PDU which has been positively acknowledged as specified in clause 5.x.1.3.3:
    3> clear the PSCCH duration(s) and PSSCH duration(s) corresponding to retransmission(s) of the MAC PDU from the configured sidelink grant;
1> else if a sidelink grant has been received on the PDCCH for the MAC entity's SLCS-RNTI:
  2> if PDCCH contents indicate retransmission(s) for an activated configured sidelink grant:
    3> use the received sidelink grant to determine PSCCH duration(s) and PSSCH duration(s) for one or more retransmissions of a single MAC PDU according to clause 8.1.2 of TS 38.214;
  2> else if PDCCH contents indicate configured grant Type 2 deactivation for a configured sidelink grant:
    3> clear the configured sidelink grant, if available;
    3> trigger configured sidelink grant confirmation for the configured sidelink grant;
  2> else if PDCCH contents indicate configured grant Type 2 activation for a configured sidelink grant:
    3> trigger configured sidelink grant confirmation for the configured sidelink grant;
    3> store the configured sidelink grant; If the configured sidelink grant had a target destination, the link this destination to the configured sidelink grant.
    3> initialise or re-initialise the configured sidelink grant to determine the set of PSCCH durations and the set of PSSCH durations for transmissions of multiple MAC PDUs according to clause 8.1.2 of TS 38.214.

If the MAC entity has been configured by RRC to transmit using pool(s) of resources in a carrier as indicated in TS 38.331 or TS 36.331 based on sensing or random selection, the MAC entity shall for each Sidelink process:
  NOTE: If the MAC entity has been configured by RRC to transmit using neither SL-RNTI nor SLCS-RNTI but is configured by RRC to transmit using a pool of resources in a carrier as indicated in TS 38.331, the MAC entity can create a configured sidelink grant on the pool of resources only after releasing other configured sidelink grant(s), if any.
1> if the MAC entity has selected to create a configured sidelink grant corresponding to transmissions of multiple MAC PDUs, and SL data is available in a logical channel:
  2> perform the TX resource (re-)selection check as specified in clause 5.x.1.2;
  NOTE: The MAC entity continuously performs the TX resource (re-)selection check until the corresponding pool of resources is released by RRC or the MAC entity cancels selecting to create a configured sidelink grant corresponding to transmissions of multiple MAC PDUs.
  2> if the TX resource (re-)selection is triggered as the result of the TX resource (re-)selection check:

3> select one of the allowed values configured by RRC in sl-ResourceReservePeriodList and set the resource reservation interval with the selected value;

3> randomly select, with equal probability, an integer value in the interval [5, 15] for the resource reservation interval higher than or equal to 100 ms and set SL_RESOURCE_RESELECTION_COUNTER to the selected value;

3> select the number of HARQ retransmissions from the allowed numbers that are configured by RRC in sl-MaxTxTransNumPSSCH included in sl-PSSCH-TxConfigList and, if configured by upper layers, overlapped in sl-MaxTxTransNumPSSCH indicated in sl-CBR-PSSCH-TxConfigList for the highest priority of the logical channel(s) allowed on the carrier and the CBR measured by lower layers according to TS 38.2xx [xx] if CBR measurement results are available or the corresponding sl-defaultTxConfigIndex configured by RRC if CBR measurement results are not available;

3> select an amount of frequency resources within the range that is configured by RRC between sl-MinSubChannelNumPSSCH and sl-MaxSubchannelNumPSSCH included in sl-PSSCH-TxConfigList and, if configured by RRC, overlapped between MinSubChannelNumPSSCH and MaxSubchannelNumPSSCH indicated in sl-CBR-PSSCH-TxConfigList for the highest priority of the logical channel(s) allowed on the carrier and the CBR measured by lower layers according to TS 38.2xx [xx] if CBR measurement results are available or the corresponding sl-defaultTxConfigIndex configured by RRC if CBR measurement results are not available;

3> select a Destination associated to one of unicast, groupcast and broadcast, having the logical channel or the MAC CE with the highest priority, among the logical channels that satisfy all the following conditions and MAC CE(s), if any:
  4> SBj>0, in case there is any logical channel having SBj>0.

3> If the grant uses assistance information that is of type that is destination specific:
  4> use the assistance information to reduce the set of resources indicated by the physical layer according to clause 8.1.4 of TS 38.214, according to the amount of selected frequency resources and the remaining PDB of SL data available in the logical channel(s) allowed on the carrier, 3> randomly select the time and frequency resources for one transmission opportunity from the resources indicated by the physical layer according to clause 8.1.4 of TS 38.214, according to the amount of selected frequency resources and the remaining PDB of SL data available in the logical channel(s) allowed on the carrier and the reduction of the set of resources;

3> use the randomly selected resource to select a set of periodic resources spaced by the resource reservation interval for transmissions of PSCCH and PSSCH corresponding to the number of transmission opportunities of MAC PDUs determined in TS 38.214;

3> if one or more HARQ retransmissions are selected:
  4> if there are available resources left in the resources indicated by the physical layer according to clause 8.1.4 of TS 38.214 for more transmission opportunities:
    5> randomly select the time and frequency resources for one or more transmission opportunities from the available resources, according to the amount of selected frequency resources, the selected number of HARQ retransmissions and the remaining PDB of SL data available in the logical channel(s) allowed on the carrier, and the reduction of the set of resources;
    5> use the randomly selected resource to select a set of periodic resources spaced by the resource reservation interval for transmissions of PSCCH and PSSCH corresponding to the number of retransmission opportunities of the MAC PDUs determined in TS 38.214;
    5> [consider the first set of transmission opportunities as the new transmission opportunities and the other set of transmission opportunities as the retransmission opportunities;]
    5> consider the set of new transmission opportunities and retransmission opportunities as the selected sidelink grant.
  3> else:
    4> consider the set as the selected sidelink grant;
3> use the selected sidelink grant to determine the set of PSCCH durations and the set of PSSCH durations according to TS38.214;
3> consider the selected sidelink grant to be a configured sidelink grant.
3> if the selected Destination is unicast, link this destination to the configured sidelink grant.

2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in sl-ProbResourceKeep:
  3> clear the configured sidelink grant, if available;
  3> If the grant is linked to a Destination:
    4> select a Destination associated to one of unicast, groupcast and broadcast, having the logical channel or the MAC CE with the highest priority, among the logical channels that satisfy all the following conditions and MAC CE(s), if any:
      5> SBj>0, in case there is any logical channel having SBj>0.
  3> randomly select, with equal probability, an integer value in the interval [5, 15] for the resource reservation interval higher than or equal to 100 ms and set SL_RESOURCE_RESELECTION_COUNTER to the selected value;
  3> use the previously selected sidelink grant for the number of transmissions of the MAC PDUs determined in TS 38.214 with the resource reservation interval to determine the set of PSCCH durations and the set of PSSCH durations according to TS 38.214;
  3> consider the selected sidelink grant to be a configured sidelink grant.

3> if the selected Destination is unicast, link this destination to the configured sidelink grant.
1> if the MAC entity has selected to create a configured sidelink grant corresponding to transmission(s) of a single MAC PDU, and if SL data is available in a logical channel or a SL-CSI reporting is triggered:
  2> perform the TX resource (re-)selection check as specified in clause 5.x.1.2;
  2> if the TX resource (re-)selection is triggered as the result of the TX resource (re-)selection check:
    3> select the number of HARQ retransmissions from the allowed numbers that are configured by RRC in sl-MaxTxTransNumPSSCH included in sl-PSSCH-TxConfigList and, if configured by RRC, overlapped in sl-MaxTxTransNumPSSCH indicated in sl-CBR-PSSCH-TxConfigList for the highest priority of the logical channel(s) allowed on the carrier and the CBR measured by lower layers according to TS 38.2xx [xx] if CBR measurement results are available or the corresponding sl-defaultTxConfigIndex configured by RRC if CBR measurement results are not available;
    3> select an amount of frequency resources within the range that is configured by RRC between sl-MinSubChannelNumPSSCH and sl-MaxSubChannelNumPSSCH included in sl-PSSCH-TxConfigList and, if configured by RRC, overlapped between sl-MinSubChannelNumPSSCH and sl-MaxSubChannelNumPSSCH indicated in sl-CBR-PSSCH-TxConfigList for the highest priority of the logical channel(s) allowed on the carrier and the CBR measured by lower layers according to TS 38.2xx [xx] if CBR measurement results are available or the corresponding sl-defaultTxConfigIndex configured by RRC if CBR measurement results are not available;
    3> select a Destination associated to one of unicast, groupcast and broadcast, having the logical channel or the MAC CE with the highest priority, among the logical channels that satisfy all the following conditions and MAC CE(s), if any:
      4> SBj>0, in case there is any logical channel having SBj>0.
    3> If the grant uses assistance information that is of type that is destination specific:
      4> use the assistance information to reduce the set of resources indicated by the physical layer according to clause 8.1.4 of TS 38.214, according to the amount of selected frequency resources and the remaining PDB of SL data available in the logical channel(s) allowed on the carrier,
    3> randomly select the time and frequency resources for one transmission opportunity from the resources indicated by the physical layer according to clause 8.1.4 of TS 38.214, according to the amount of selected frequency resources and the remaining PDB of SL data available in the logical channel(s) allowed on the carrier, and the reduction of the set of resources;
    3> if one or more HARQ retransmissions are selected:
      4> if there are available resources left in the resources indicated by the physical layer according to clause 8.1.4 of TS 38.214 for more transmission opportunities:
        5> randomly select the time and frequency resources for one or more transmission opportunities from the available resources, according to the amount of selected frequency resources, the selected number of HARQ retransmissions and the remaining PDB of SL data available in the logical channel(s) allowed on the carrier and the reduction of the set of resources;
        5> [consider a transmission opportunity which comes first in time as the new transmission opportunity and a transmission opportunity which comes later in time as the retransmission opportunity];
        5> consider both of the transmission opportunities as the selected sidelink grant;
    3> else:
      4> consider the set as the selected sidelink grant;
    3> use the selected sidelink grant to determine PSCCH duration(s) and PSSCH duration(s) according to TS 38.214;
    3> consider the selected sidelink grant to be a configured sidelink grant.
    3> if the selected Destination is unicast, link this destination to the configured sidelink grant.
1> if a configured sidelink grant is available for retransmission(s) of a MAC PDU which has been positively acknowledged as specified in clause 5.x.1.3.3:
  2> clear the PSCCH duration(s) and PSSCH duration(s) corresponding to retransmission(s) of the MAC PDU from the configured sidelink grant.
The MAC entity shall for each PSSCH duration:
1> for each configured sidelink grant occurring in this PSSCH duration:
  2> if the MAC entity has been configured by RRC to transmit using a SL-RNTI or SLCS-RNTI:
    3> select an MCS which is, if configured, within the range that is configured by RRC between sl-MinMCS-PSSCH and sl-MaxMCS-PSSCH included in SL-ScheduledConfig;
  2> else:
    3> select a MCS which is, if configured, within the range that is configured by RRC between sl-MinMCS-PSSCH and sl-MaxMCS-PSSCH included in sl-PSSCH-TxConfigList and, if configured by RRC, overlapped between sl-MinMCS-PSSCH and sl-MaxMCS-PSSCH indicated in sl-CBR-PSSCH-TxConfigList for the highest priority of the sidelink logical channel(s) in the MAC PDU and the CBR measured by RRC according to TS 38.2xx [xx] if CBR measurement results are available or the corresponding sl-defaultTxConfigIndex configured by RRC if CBR measurement results are not available;
  NOTE: MCS selection is up to UE implementation if the MCS or the corresponding range is not configured by upper layers.
  2> deliver the sidelink grant, the destination linked to the sidelink grant (if any), the selected MCS, and the associated HARQ information to the Sidelink HARQ Entity for this PSSCH duration.
Modified Section 5.x.1.4.1.2 Selection of Logical Channels
The MAC entity shall for each SCI corresponding to a new transmission:
1> If the grant has a linked Destination:
  2> use this as the selected Destination;
1> else:

2> select a Destination associated to one of unicast, groupcast and broadcast, having the logical channel or the MAC CE with the highest priority, among the logical channels that satisfy all the following conditions and MAC CE(s), if any, for the SL grant associated to the SCI:
   3> SL data is available for transmission; and
   3> SBj>0, in case there is any logical channel having SBj>0; and
   3> sl-configuredSLGrantType1Allowed, if configured, is set to true in case the SL grant is a Configured Grant Type 1.
NOTE: If multiple Destinations have the logical channels satisfying all conditions above with the same highest priority or if multiple Destinations have the MAC CE with the highest priority, which Destination is selected among them is up to UE implementation.
1> select the logical channels satisfying all the following conditions among the logical channels belonging to the selected Destination:
  2> SL data is available for transmission; and
  2> sl-configuredSLGrantType1Allowed, if configured, is set to true in case the SL grant is a Configured Grant Type 1; and
  2> A logical channel has been equivalently set with the logical channel with the highest priority in sl-HARQ-FeedbackEnabled.

APPENDIX 2

Modified Section 5.x.1.1 SL Grant Reception and SCI Transmission

Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs.

If the MAC entity has been configured by RRC to transmit using a SL-RNTI or SLCS-RNTI as indicated in TS 38.331 or TS 36.331, the MAC entity shall for each PDCCH occasion and for each grant received for this PDCCH occasion:
1> if a sidelink grant has been received on the PDCCH for the MAC entity's SL-RNTI:
  2> if the NDI received on the PDCCH has been not toggled compared to the value in the previously received HARQ information for the HARQ Process ID:
   3> use the received sidelink grant to determine PSCCH duration(s) and PSSCH duration(s) for one or more retransmissions of a single MAC PDU for the corresponding Sidelink process according to clause 8.1.2 of TS 38.214;
  2> else:
   3> use the received sidelink grant to determine PSCCH duration(s) and PSSCH duration(s) for initial transmission and, if available, retransmission(s) of a single MAC PDU according to clause 8.1.2 of TS 38.214;
  2> consider the received sidelink grant to be a configured sidelink grant;
  2> if a configured sidelink grant is available for retransmission(s) of a MAC PDU which has been positively acknowledged as specified in clause 5.x.1.3.3:
   3> clear the PSCCH duration(s) and PSSCH duration(s) corresponding to retransmission(s) of the MAC PDU from the configured sidelink grant;
1> else if a sidelink grant has been received on the PDCCH for the MAC entity's SLCS-RNTI:
  2> if PDCCH contents indicate retransmission(s) for an activated configured sidelink grant:
   3> use the received sidelink grant to determine PSCCH duration(s) and PSSCH duration(s) for one or more retransmissions of a single MAC PDU according to clause 8.1.2 of TS 38.214;
  2> else if PDCCH contents indicate configured grant Type 2 deactivation for a configured sidelink grant:
   3> clear the configured sidelink grant, if available;
   3> trigger configured sidelink grant confirmation for the configured sidelink grant;
  2> else if PDCCH contents indicate configured grant Type 2 activation for a configured sidelink grant:
   3> trigger configured sidelink grant confirmation for the configured sidelink grant;
   3> store the configured sidelink grant;
   3> initialise or re-initialise the configured sidelink grant to determine the set of PSCCH durations and the set of PSSCH durations for transmissions of multiple MAC PDUs according to clause 8.1.2 of TS 38.214.

If the MAC entity has been configured by RRC to transmit using pool(s) of resources in a carrier as indicated in TS 38.331 or TS 36.331 based on sensing or random selection, the MAC entity shall for each Sidelink process:
NOTE: If the MAC entity has been configured by RRC to transmit using neither SL-RNTI nor SLCS-RNTI but is configured by RRC to transmit using a pool of resources in a carrier as indicated in TS 38.331, the MAC entity can create a configured sidelink grant on the pool of resources only after releasing other configured sidelink grant(s), if any.
1> if the MAC entity has selected to create a configured sidelink grant corresponding to transmissions of multiple MAC PDUs, and SL data is available in a logical channel:
  2> perform the TX resource (re-)selection check as specified in clause 5.x.1.2;
NOTE: The MAC entity continuously performs the TX resource (re-)selection check until the corresponding pool of resources is released by RRC or the MAC entity cancels selecting to create a configured sidelink grant corresponding to transmissions of multiple MAC PDUs.
  2> if the TX resource (re-)selection is triggered as the result of the TX resource (re-)selection check:
   3> select one of the allowed values configured by RRC in sl-ResourceReservePeriodList and set the resource reservation interval with the selected value;
   3> randomly select, with equal probability, an integer value in the interval [5, 15] for the resource reservation interval higher than or equal to 100 ms and set SL_RESOURCE_RESELECTION_COUNTER to the selected value;
   3> select the number of HARQ retransmissions from the allowed numbers that are configured by RRC in sl-MaxTxTransNumPSSCH included in sl-PSSCH-TxConfigList and, if configured by upper layers, overlapped in sl-MaxTxTransNumPSSCH indicated in sl-CBR-PSSCH-TxConfigList for the highest priority of the logical channel(s) allowed on the carrier and the CBR measured by lower layers according to TS 38.2xx [xx] if CBR measurement results are available or the corresponding sl-defaultTxConfigIndex configured by RRC if CBR measurement results are not available;

3> select an amount of frequency resources within the range that is configured by RRC between sl-MinSubChannelNumPSSCH and sl-MaxSubchannelNumPSSCH included in sl-PSSCH-TxConfigList and, if configured by RRC, overlapped between MinSubChannelNumPSSCH and MaxSubchannelNumPSSCH indicated in sl-CBR-PSSCH-TxConfigList for the highest priority of the logical channel(s) allowed on the carrier and the CBR measured by lower layers according to TS 38.2xx [xx] if CBR measurement results are available or the corresponding sl-defaultTxConfigIndex configured by RRC if CBR measurement results are not available;

3> If the grant uses assistance information that is of type that is destination specific:
    4> use the assistance information to reduce the set of resources indicated by the physical layer according to clause 8.1.4 of TS 38.214, according to the amount of selected frequency resources and the remaining PDB of SL data available in the logical channel(s) allowed on the carrier.

3> randomly select the time and frequency resources for one transmission opportunity from the resources indicated by the physical layer according to clause 8.1.4 of TS 38.214, according to the amount of selected frequency resources and the remaining PDB of SL data available in the logical channel(s) allowed on the carrier and the reduction of the set of resources;

3> use the randomly selected resource to select a set of periodic resources spaced by the resource reservation interval for transmissions of PSCCH and PSSCH corresponding to the number of transmission opportunities of MAC PDUs determined in TS 38.214;

3> if one or more HARQ retransmissions are selected:
    4> if there are available resources left in the resources indicated by the physical layer according to clause 8.1.4 of TS 38.214 for more transmission opportunities:
        5> randomly select the time and frequency resources for one or more transmission opportunities from the available resources, according to the amount of selected frequency resources, the selected number of HARQ retransmissions and the remaining PDB of SL data available in the logical channel(s) allowed on the carrier, and the reduction of the set of resources;
        5> use the randomly selected resource to select a set of periodic resources spaced by the resource reservation interval for transmissions of PSCCH and PSSCH corresponding to the number of retransmission opportunities of the MAC PDUs determined in TS 38.214;
        5> [consider the first set of transmission opportunities as the new transmission opportunities and the other set of transmission opportunities as the retransmission opportunities;]
        5> consider the set of new transmission opportunities and retransmission opportunities as the selected sidelink grant.
    3> else:
        4> consider the set as the selected sidelink grant;
3> use the selected sidelink grant to determine the set of PSCCH durations and the set of PSSCH durations according to TS 38.214;
3> consider the selected sidelink grant to be a configured sidelink grant.
3> if the selected Destination is unicast, link this destination to the configured sidelink grant.

2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in sl-ProbResourceKeep:
    3> clear the configured sidelink grant, if available;
    3> If the grant is linked to a Destination:
        4> select a Destination associated to one of unicast, groupcast and broadcast, having the logical channel or the MAC CE with the highest priority, among the logical channels that satisfy all the following conditions and MAC CE(s), if any:
            5> SBj>0, in case there is any logical channel having SBj>0.
    3> randomly select, with equal probability, an integer value in the interval [5, 15] for the resource reservation interval higher than or equal to 100 ms and set SL_RESOURCE_RESELECTION_COUNTER to the selected value;
    3> use the previously selected sidelink grant for the number of transmissions of the MAC PDUs determined in TS 38.214 with the resource reservation interval to determine the set of PSCCH durations and the set of PSSCH durations according to TS 38.214;
    3> consider the selected sidelink grant to be a configured sidelink grant.
    3> if the selected Destination is unicast, link this destination to the configured sidelink grant.

1> If the MAC entity has selected to create a configured sidelink grant corresponding to transmission(s) of a single MAC PDU, and if SL data is available in a logical channel or a SL-CSI reporting is triggered:
    2> perform the TX resource (re-)selection check as specified in clause 5.x.1.2;
    2> if the TX resource (re-)selection is triggered as the result of the TX resource (re-)selection check:
        3> select the number of HARQ retransmissions from the allowed numbers that are configured by RRC in sl-MaxTxTransNumPSSCH included in sl-PSSCH-TxConfigList and, if configured by RRC, overlapped in sl-MaxTxTransNumPSSCH indicated in sl-CBR-PSSCH-TxConfigList for the highest priority of the logical channel(s) allowed on the carrier and the CBR measured by lower layers according to TS 38.2xx [xx] if CBR measurement results are available or the corresponding sl-defaultTxConfigIndex configured by RRC if CBR measurement results are not available;
        3> select an amount of frequency resources within the range that is configured by RRC between sl-MinSubChannelNumPSSCH and sl-MaxSub- ChannelNumPSSCH included in sl-PSSCH-TxConfigList and, if configured by RRC, overlapped between sl-MinSubChannelNumPSSCH and sl-MaxSubChannelNumPSSCH indicated in sl-CBR-PSSCH-TxConfigList for the highest priority of the logical channel(s) allowed on the carrier and the CBR measured by lower layers according to TS 38.2xx [xx] if CBR measurement results are available or the corresponding sl-defaultTxConfigIndex configured by RRC if CBR measurement results are not available;
   3> If the grant uses assistance information that is of type that is destination specific:
      4> use the assistance information to reduce the set of resources indicated by the physical layer according to clause 8.1.4 of TS 38.214, according to the amount of selected frequency resources and the remaining PDB of SL data available in the logical channel(s) allowed on the carrier.
   3> randomly select the time and frequency resources for one transmission opportunity from the resources indicated by the physical layer according to clause 8.1.4 of TS 38.214, according to the amount of selected frequency resources and the remaining PDB of SL data available in the logical channel(s) allowed on the carrier, and the reduction of the set of resources;
   3> if one or more HARQ retransmissions are selected:
      4> if there are available resources left in the resources indicated by the physical layer according to clause 8.1.4 of TS 38.214 for more transmission opportunities:
         5> randomly select the time and frequency resources for one or more transmission opportunities from the available resources, according to the amount of selected frequency resources, the selected number of HARQ retransmissions and the remaining PDB of SL data available in the logical channel(s) allowed on the carrier and the reduction of the set of resources;
         5> [consider a transmission opportunity which comes first in time as the new transmission opportunity and a transmission opportunity which comes later in time as the retransmission opportunity];
         5> consider both transmission opportunities as the selected sidelink grant;
   3> else:
      4> consider the set as the selected sidelink grant;
   3> use the selected sidelink grant to determine PSCCH duration(s) and PSSCH duration(s) according to TS 38.214;
   3> consider the selected sidelink grant to be a configured sidelink grant.
   3> if the selected Destination is unicast, link this destination to the configured sidelink grant.
1> If a configured sidelink grant is available for retransmission(s) of a MAC PDU which has been positively acknowledged as specified in clause 5.x.1.3.3:
   2> clear the PSCCH duration(s) and PSSCH duration(s) corresponding to retransmission(s) of the MAC PDU from the configured sidelink grant.
The MAC entity shall for each PSSCH duration:
1> for each configured sidelink grant occurring in this PSSCH duration:
   2> if the MAC entity has been configured by RRC to transmit using a SL-RNTI or SLCS-RNTI:
      3> select an MCS which is, if configured, within the range that is configured by RRC between sl-MinMCS-PSSCH and sl-MaxMCS-PSSCH included in SL-ScheduledConfig;
   2> else:
      3> select a MCS which is, if configured, within the range that is configured by RRC between sl-MinMCS-PSSCH and sl-MaxMCS-PSSCH included in sl-PSSCH-TxConfigList and, if configured by RRC, overlapped between sl-MinMCS-PSSCH and sl-MaxMCS-PSSCH indicated in sl-CBR-PSSCH-TxConfigList for the highest priority of the sidelink logical channel(s) in the MAC PDU and the CBR measured by RRC according to TS 38.2xx [xx] if CBR measurement results are available or the corresponding sl-defaultTxConfigIndex configured by RRC if CBR measurement results are not available;
NOTE: MCS selection is up to UE implementation if the MCS or the corresponding range is not configured by upper layers.
   2> deliver the sidelink grant, the destination linked to the sidelink grant (if any), the selected MCS, and the associated HARQ information to the Sidelink HARQ Entity for this PSSCH duration.
Modified Section 5.x.1.4.1.2 Selection of Logical Channels
The MAC entity shall for each SCI corresponding to a new transmission:
   1> select a Destination associated to one of unicast, groupcast and broadcast, having the logical channel or the MAC CE with the highest priority, among the logical channels that satisfy all the following conditions and MAC CE(s), if any, for the SL grant associated to the SCI:
      2> SL data is available for transmission; and
      2> SBj>0, in case there is any logical channel having SBj>0; and
      2> sl-configuredSLGrantType1Allowed, if configured, is set to true in case the SL grant is a Configured Grant Type 1.
NOTE: If multiple Destinations have the logical channels satisfying all conditions above with the same highest priority or if multiple Destinations have the MAC CE with the highest priority, which Destination is selected among them is up to UE implementation.
1> If the grant has a linked Destination and the linked Destination matches the Selected Destination:
   2> use the linked Destination as the selected Destination;
1> else:
   2> trigger the Sidelink Grant Reception to use assistance information for the selected Destination;
   2> use linked Destination as the selected Destination;
1> select the logical channels satisfying all the following conditions among the logical channels belonging to the selected Destination:
   2> SL data is available for transmission; and
   2> sl-configuredSLGrantType1Allowed, if configured, is set to true in case the SL grant is a Configured Grant Type 1; and
   2> a logical channel has been equivalently set with the logical channel with the highest priority in sl-HARQ-FeedbackEnabled.

TABLE 1

| Abbreviations | |
| --- | --- |
| BSR | Buffer Status Reporting |
| CSI | Channel State Information |
| DCI | Downlink Control Information |
| gNB | NR NodeB |
| HARQ | Hybrid Automatic Repeat Request |
| IC | In Coverage |
| LCP | Logical Channel Prioritization |
| MAC | Media Access Control |
| NAS | Non-Access Stratum |
| NG-RAN | NG-Radio Access Network |
| NR | New Radio |
| OOC | Out of Coverage |
| PDCCH | Physical Dedicated Control Channel |
| PDU | Protocol Data Unit |
| PHY | Physical |
| PHR | Power Headroom |
| PIR | Packet Inter-Reception |
| PLMN | Public Land Mobile Network |
| PRR | Packet Reception Ratio |
| PSCCH | Physical Sidelink Control Channel |
| PSFCH | Physical Sidelink Feedback Channel |
| PSSCH | Physical Sidelink Shared Channel |
| PUSCH | Physical Uplink Shared Channel |
| RAN | Radio Access Network |
| QoS | Quality of Service |
| RNTI | Radio Network Temporary Identifier |
| RRC | Radio Resource Control |
| RSRP | Reference Signal Receive Power |
| RX or Rx | Receive |
| SCI | Sidelink Control Information |
| SINR | Signal-to-noise-plus-interference ratio |
| SL | Sidelink |
| SL-BCH | Sidelink Broadcast Channel |
| SL SCH | Sidelink Shared Channel |
| SLCS | Sidelink Configured Scheduling |
| SLRB | Sidelink Radio Bearer |
| SR | Scheduling Request |
| TX or Tx | Transmit |
| UCI | Uplink Control Information |
| UE | User Equipment |

We claim:

1. A first wireless transmit/receive unit (WTRU) comprising a processor and memory comprising computer-executable instructions which, when executed by the processor, cause the first WTRU to:
   send a request for a preferred resource set for sidelink transmission, wherein the preferred resource set comprises one or more resources which are preferred for transmission from the first WTRU;
   receive the preferred resource set;
   determine, from a first candidate resource set obtained from sensing by the first WTRU, based on the preferred resource set, a second candidate resource set; and
   on condition that transmission resources available in the second candidate resource set are not sufficient for a sidelink transmission, transmit, using transmission resources determined based on the first candidate resource set, the sidelink transmission.

2. The first WTRU of claim 1, wherein the request for a preferred resource set is sent to a second WTRU, and wherein the preferred resource set is received from the second WTRU.

3. The first WTRU of claim 1, wherein the first candidate resource set is provided by a physical layer.

4. The first WTRU of claim 1, wherein the second candidate resource set is determined based on selection of resources that are both in the preferred resource set and in the first candidate resource set.

5. A method, implemented by a first wireless transmit/receive unit (WTRU), the method comprising:
   sending a request for a preferred resource set for sidelink transmission, wherein the preferred resource set comprises one or more resources which are preferred for transmission from the first WTRU;
   receiving the preferred resource set;
   determining, from a first candidate resource set obtained from sensing by the first WTRU, based on the preferred resource set, a second candidate resource set; and
   on condition that transmission resources available in the second candidate resource set are not sufficient for a sidelink transmission, transmitting, using transmission resources determined based on the first candidate resource set, the sidelink transmission.

6. The method of claim 5, wherein the request for a preferred resource set is sent to a second WTRU, and wherein the preferred resource set is received from the second WTRU.

7. The method of claim 5, wherein the first candidate resource set is provided by a physical layer.

8. The method of claim 5, wherein the second candidate resource set is determined based on selection of resources that are both in the preferred resource set and in the first candidate resource set.

* * * * *